(12) United States Patent
Zhang et al.

(10) Patent No.: US 12,464,068 B2
(45) Date of Patent: Nov. 4, 2025

(54) DEVICE RECOMMENDATION METHOD AND ELECTRONIC DEVICE

(71) Applicant: Huawei Technologies Co., Ltd., Shenzhen (CN)

(72) Inventors: Li Zhang, Nanjing (CN); Zhong Du, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 405 days.

(21) Appl. No.: 18/248,619

(22) PCT Filed: Oct. 11, 2021

(86) PCT No.: PCT/CN2021/123092
§ 371 (c)(1),
(2) Date: Apr. 11, 2023

(87) PCT Pub. No.: WO2022/078295
PCT Pub. Date: Apr. 21, 2022

(65) Prior Publication Data
US 2023/0388407 A1    Nov. 30, 2023

(30) Foreign Application Priority Data
Oct. 12, 2020  (CN) .......... 202011085324.1

(51) Int. Cl.
H04M 1/72436 (2021.01)
H04M 1/72412 (2021.01)
(52) U.S. Cl.
CPC ... H04M 1/72436 (2021.01); H04M 1/72412 (2021.01)

(58) Field of Classification Search
CPC ......... H04M 1/72412; H04M 1/72436; H04M 1/72469; H04M 1/72439; H04B 5/00; H04B 5/0031
See application file for complete search history.

(56) References Cited

U.S. PATENT DOCUMENTS

| | | |
|---|---|---|
| 2018/0314959 A1 | 11/2018 | Apokatanidis et al. |
| 2019/0075373 A1 | 3/2019 | Da Fonseca et al. |

FOREIGN PATENT DOCUMENTS

| | | |
|---|---|---|
| CN | 103748610 A | 4/2014 |
| CN | 104639957 A | 5/2015 |
| CN | 106385622 A | 2/2017 |
| CN | 107529066 A | 12/2017 |
| CN | 109660842 A | 4/2019 |
| CN | 109842806 A | 6/2019 |
| CN | 110381195 A | 10/2019 |

(Continued)

Primary Examiner — Tuan H Nguyen
(74) Attorney, Agent, or Firm — Slater Matsil, LLP

(57) ABSTRACT

A first device displays a chat interface with a first contact, where the chat interface includes a first chat message; the first device displays first prompt information on the chat interface when the first chat message includes first content, where the first prompt information is used to recommend a second device to a user; the first device displays second prompt information on the chat interface in response to an operation of confirming the first prompt information by the user, where the second prompt information is used to prompt the user to open the first content in the second device; and in response to an operation of confirming the second prompt information by the user, the first device indicates the second device to open the first content.

20 Claims, 37 Drawing Sheets

(56) References Cited

FOREIGN PATENT DOCUMENTS

| CN | 111404802 A | 7/2020 |
| CN | 111586452 A | 8/2020 |
| CN | 111741372 A | 10/2020 |

Television 1

Television 1

DEVICE RECOMMENDATION METHOD AND ELECTRONIC DEVICE

CROSS-REFERENCE TO RELATED APPLICATIONS

This application is a national stage of International Application No. PCT/CN2021/123092, filed on Oct. 11, 2021, which claims priority to Chinese Patent Application No. 202011085324.1, filed on Oct. 12, 2020. Both of the aforementioned applications are hereby incorporated by reference in their entireties.

TECHNICAL FIELD

This application relates to the terminal field, and in particular, to a device recommendation method and an electronic device.

BACKGROUND

Currently, in a chat app, a user may share content such as audio, a video, or a picture with a contact in a form of a chat message. For example, when a user Jack watches a program A by using a video app, if the user Jack intends to share the program A with a contact Sam in the chat app, the user Jack may jump to the chat app by using a sharing function in the video app, and send the program A to the contact Sam in the chat app in a form of a chat message.

In this case, as shown in FIG. 1A, the user Sam may receive, in a chat app of the user Sam, a chat message 101 sent by the contact Jack. The chat message 101 may display related information of the program A in the video app in a form of a card. If it is detected that a user (for example, Sam) taps the chat message 101, as shown in FIG. 1B, a mobile phone may jump from the chat app to a playback interface 102 of the program A in the video app, and start to play the program A. Subsequently, if the user intends to play the program A by using another device, the user may open a projection option 103 on the playback interface 102 to perform projection. For example, as shown in FIG. 1C, the mobile phone may display one or more found projection devices in a device list 104. After the user selects a corresponding projection device from the device list 104, the mobile phone may project the program A that is being played to the projection device selected by the user for play.

It can be learned that, when the user opens content in the chat message by using the chat message shared in the chat app as an entry, the user needs to continuously perform selection, and the mobile phone accordingly needs to continuously switch applications and jump interfaces, to open the content in the chat message in an expected device of the user. Consequently, a process of presenting the content in the chat message is complex.

SUMMARY

This application provides a device recommendation method and an electronic device. After receiving a chat message sent by a contact, the electronic device may quickly recommend, to a user, a device that opens related content in the chat message, so that the content in the chat message is presented more efficiently and conveniently.

To achieve the foregoing objective, the following technical solutions are used in this application.

According to a first aspect, this application provides a device recommendation method. The method includes: When a user chats with a first contact by using a chat application, a first device may display a chat interface with the first contact, where the chat interface may include a first chat message. When the first chat message includes first content, the first device may display first prompt information on the chat interface, where the first prompt information is used to recommend a second device to the user. In response to an operation of confirming the first prompt information by the user, for example, an operation of tapping the first prompt information by the user, the first device may continue to display second prompt information on the chat interface, where the second prompt information is used to prompt the user to open the first content in the second device, that is, recommend the user to use the second device to open the first content in the first chat message. Further, in response to an operation of confirming the second prompt information by the user, an operation of tapping the second prompt information by the user, or the like, the first device may indicate the second device to open the first content.

In other words, after the user receives a chat message in the chat application by using the first device, the first device may present, to the user, the second device (that is, a recommended device) related to content in the chat message. Subsequently, if it is detected that the user confirms to use the recommended device, the first device may indicate the recommended device to open related content in the chat message. In this way, by using the chat message in the chat application as an entry, the user can quickly open the content in the chat message in the device recommended by the chat application, so that the content in the chat message can be played across devices quickly, the content in the chat message is accordingly presented more efficiently and conveniently, and user experience is improved.

In a possible implementation, the first chat message may be a last chat message on the chat interface. For example, the first chat message may be a last chat message sent by the contact. For another example, the first chat message may be a last chat message sent by the user to the contact.

In a possible implementation, the first device stores correspondences between different types of content and different recommended devices. Before the first device displays, on the chat interface, the second device recommended to the user, the method further includes: The first device obtains one or more electronic devices associated with the first device, for example, one or more electronic devices that access a same communication network as the first device, or one or more electronic devices that log in to a same account as the first device; and the first device may determine, based on the foregoing correspondences, the second device corresponding to the first content in the first chat message from the obtained one or more electronic devices.

In a possible implementation, the first content specifically includes a video, audio, a picture, a document, or a card of a preset type (for example, a video card or a music card).

In a possible implementation, the chat interface may include an input box of a chat message. That the first device displays first prompt information on the chat interface includes: The first device may display the first prompt information in the input box, where the first prompt information includes a preset symbol (for example, "@") and an identifier of the second device. To be specific, the first device may automatically input the first prompt information in the input box in a form of "@+device name", to prompt the user to use the recommended second device to open the first content in the chat message.

In a possible implementation, after the first device displays the first prompt information in the input box, the method further includes: If it is detected, within a first preset time period, that the input box obtains an input focus, the first device determines that the user confirms the first prompt information; and further, the first device may continue to display the second prompt information on the chat interface. In this way, the first prompt information recommended by the first device in the input box does not disturb a process in which the user normally inputs a chat message in the input box.

In a possible implementation, after the first device displays the first prompt information in the input box, the method further includes: If it is not detected, within the first preset time period, that the input box obtains an input focus, the first device may hide the first prompt information in the input box. In this way, a process in which the first device presents a recommended device to the user does not conflict with a process in which the user chats with the contact by using the input box, and the user does not need to perform an additional operation on the second device recommended by the first device to cancel a current device recommendation process, so that a human-computer interaction process is friendlier.

In a possible implementation, after the first device displays the second prompt information on the chat interface, the method further includes: If it is detected, within a second preset time period, that the user taps the second prompt information or a confirmation button in the second prompt information, the first device may determine that the user confirms the second prompt information, that is, the current device recommendation process ends.

In a possible implementation, after the first device displays the second prompt information on the chat interface, the method further includes: If it is not detected, within a second preset time period, that the user taps the second prompt information or a confirmation button in the second prompt information, the first device hides the second prompt information on the chat interface, that is, the current device recommendation process ends.

In a possible implementation, before the first device indicates the second device to open the first content, the method further includes: The first device searches for the second device by using a near field communication function (for example, a Bluetooth function or an NFC function), and this indicates that the second device is located near the first device. In this case, the first device may indicate the second device to open the first content, to prevent the user from indicating, due to a misoperation, the second device to open the first content in the first chat message.

In a possible implementation, the method further includes: If the first device does not find the second device by using the near field communication function, before indicating the second device to open the first content, the first device may first indicate the second device to display third prompt information, where the third prompt information is used to prompt the user to determine to open the first content in the second device. If the user confirms the third prompt information in the second device, the first device may indicate the second device to open the first content, to prevent the user from indicating, due to a misoperation, the second device to open the first content in the first chat message.

According to a second aspect, this application provides a device recommendation method. The method includes: When a user chats with a first contact by using a chat application, a first device may display a chat interface with the first contact; in response to a preset operation (for example, an operation such as touching and holding or inputting @) entered by the user on the chat interface, the first device may display a device recommendation list, where the device recommendation list includes one or more electronic devices associated with the first device; further, in response to an operation of selecting a second device from the device recommendation list by the user, the first device may display first prompt information, where the first prompt information is used to prompt the user to use the second device to open one or more pieces of content in a chat message; and subsequently, in response to an operation of confirming the first prompt information by the user, the first device may indicate the second device to open the one or more pieces of content.

In other words, the user may alternatively manually trigger, on the chat interface, the first device to recommend, to the user, a recommended device related to content in a chat message on a current chat interface, so that the content in the chat message can be presented in another device more efficiently and conveniently.

In a possible implementation, the chat interface may include an input box of a chat message, and the preset operation may be an operation of entering a preset symbol (for example, "@") in the input box by the user. That the first device displays the device recommendation list includes: The first device jumps from the chat interface to a recommendation interface and displays the device recommendation list on the recommendation interface. To be specific, if it is detected that the user inputs a preset symbol "@" in the input box, the first device may be triggered to jump to the recommendation interface to display the one or more devices recommended to the user this time.

In a possible implementation, that the first device displays the first prompt information includes: The first device displays the first prompt information in the input box, where the first prompt information includes a preset symbol (for example, "@") and an identifier of the second device. Similarly, the first device may automatically input the first prompt information in the input box in a form of "@+device name", to prompt the user to use the recommended second device to open the first content in the chat message.

In a possible implementation, the chat interface may include a first chat message and a second chat message, the first chat message includes first content, and the second chat message includes second content. In this case, before the first device displays the device recommendation list, the method further includes: The first device determines a first recommended device corresponding to the first content in the one or more electronic devices associated with the first device; and the first device determines a second recommended device corresponding to the second content in the one or more electronic devices associated with the first device. In this case, the device recommendation list displayed on the first device includes the first recommended device and the second recommended device. In other words, the first device may recommend, to the user, all devices respectively associated with content of a plurality of chat messages on a current chat interface.

In a possible implementation, the first chat message and the second chat message may be chat messages sent within a latest preset time period (for example, latest 24 hours), to ensure time validity of recommending a device by the first device to the user.

In a possible implementation, the chat interface includes a third chat message, and the third chat message includes third content. In this case, the preset operation may be a touch-and-hold operation performed by the user on the third chat message. That the first device displays the device recommendation list includes: The first device displays a touch-and-hold menu on the chat interface, where the touch-and-hold menu includes the device recommendation list. That is, if it is detected that the user inputs a touch-and-hold operation on a chat message (for example, the third chat message) on the chat interface, the first device may be triggered to display the one or more devices recommended to the user this time.

In a possible implementation, before the first device displays a touch-and-hold menu on the chat interface, the method further includes: The first device determines a third recommended device corresponding to the third content in the one or more electronic devices associated with the first device. In this case, the device recommendation list displayed on the first device includes the third recommended device.

In a possible implementation, after an operation of selecting the second device from the device recommendation list by the user is detected, and before the first device displays the first prompt information, the method further includes: The first device displays a selection interface, where a candidate item on the selection interface is content included in one or more chat messages on the chat interface; and further, in response to the candidate item selected by the user on the selection interface, the first device may determine the one or more pieces of content played on the second device. In other words, the user may manually select specific content to be played on the second device. This is not limited in this embodiment of this application.

According to a third aspect, this application provides an electronic device, including a memory, a display, and one or more processors, where the memory and the display are coupled to the processor. Certainly, the electronic device may further include input devices such as a touch sensor (the touch sensor and the display may be integrated into a touchscreen) and a mouse. The memory is configured to store computer program code, and the computer program code includes computer instructions. When the electronic device runs, the processor is configured to execute one or more computer instructions stored in the memory, so that the electronic device is enabled to perform the device recommendation method according to any implementation of the first aspect.

According to a fourth aspect, this application provides a computer-readable storage medium, including computer instructions. When the computer instructions are run on an electronic device, the electronic device is enabled to perform the device recommendation method according to any one of the foregoing implementations.

According to a fifth aspect, this application provides a computer program product. When the computer program product runs on an electronic device, the electronic device is enabled to perform the device recommendation method according to any one of the foregoing implementations.

It may be understood that the electronic device, the computer-readable storage medium, and the computer program product provided in the foregoing aspects are all applied to the corresponding methods provided above. Therefore, for beneficial effects that can be achieved by the electronic device, the computer-readable storage medium, and the computer program product, refer to beneficial effects in the corresponding systems or methods provided above. Details are not described herein again.

DETAILED DESCRIPTION OF ILLUSTRATIVE EMBODIMENTS

The following describes implementations of embodiments in detail with reference to the accompanying drawings.

A device recommendation method according to an embodiment of this application may be applied to a recommendation system 200.

Figure 1A:
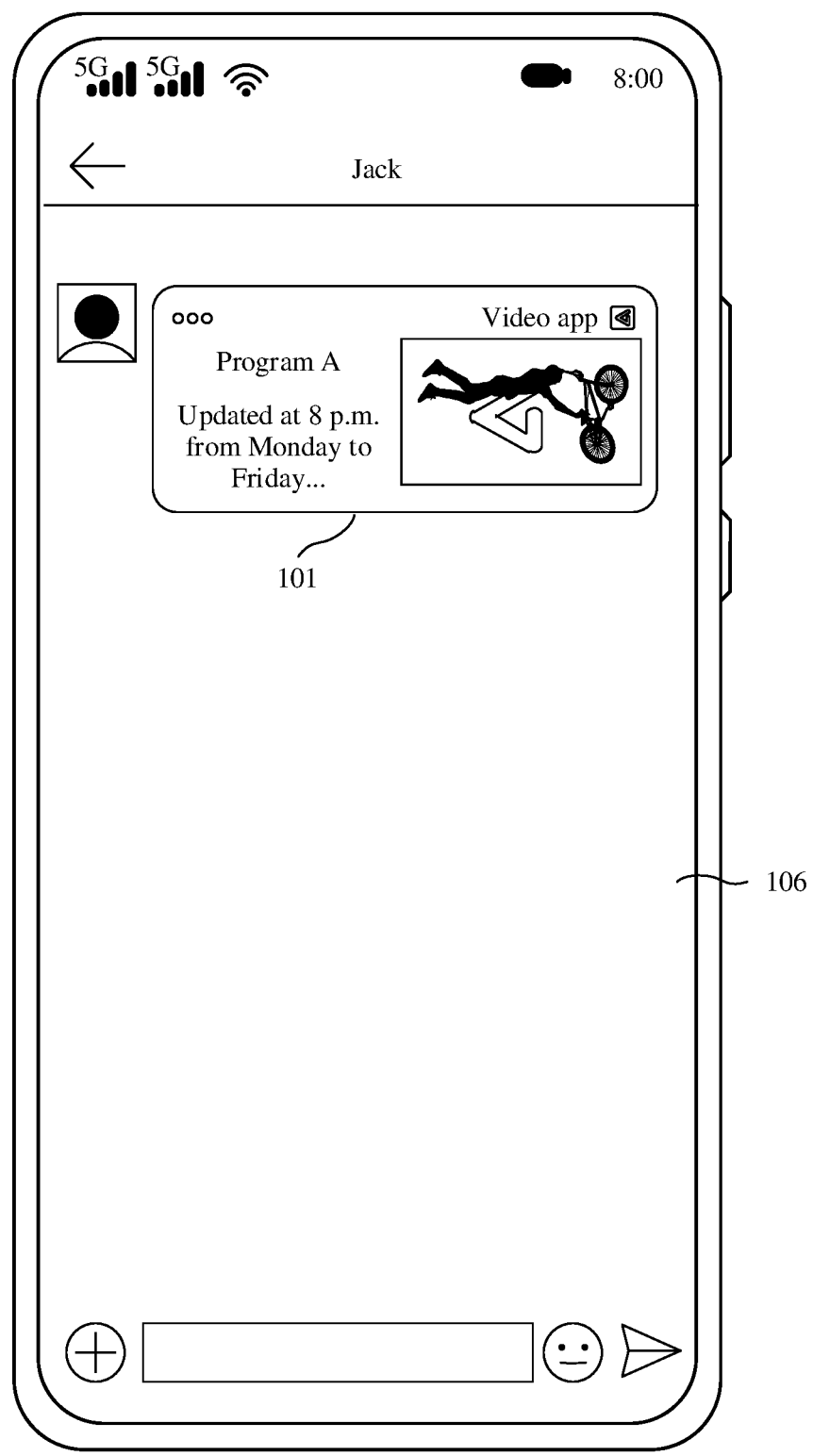
FIG. 1A to FIG. 1C are a schematic diagram of an application scenario of a projection method in a current technology.
Figure 1B:
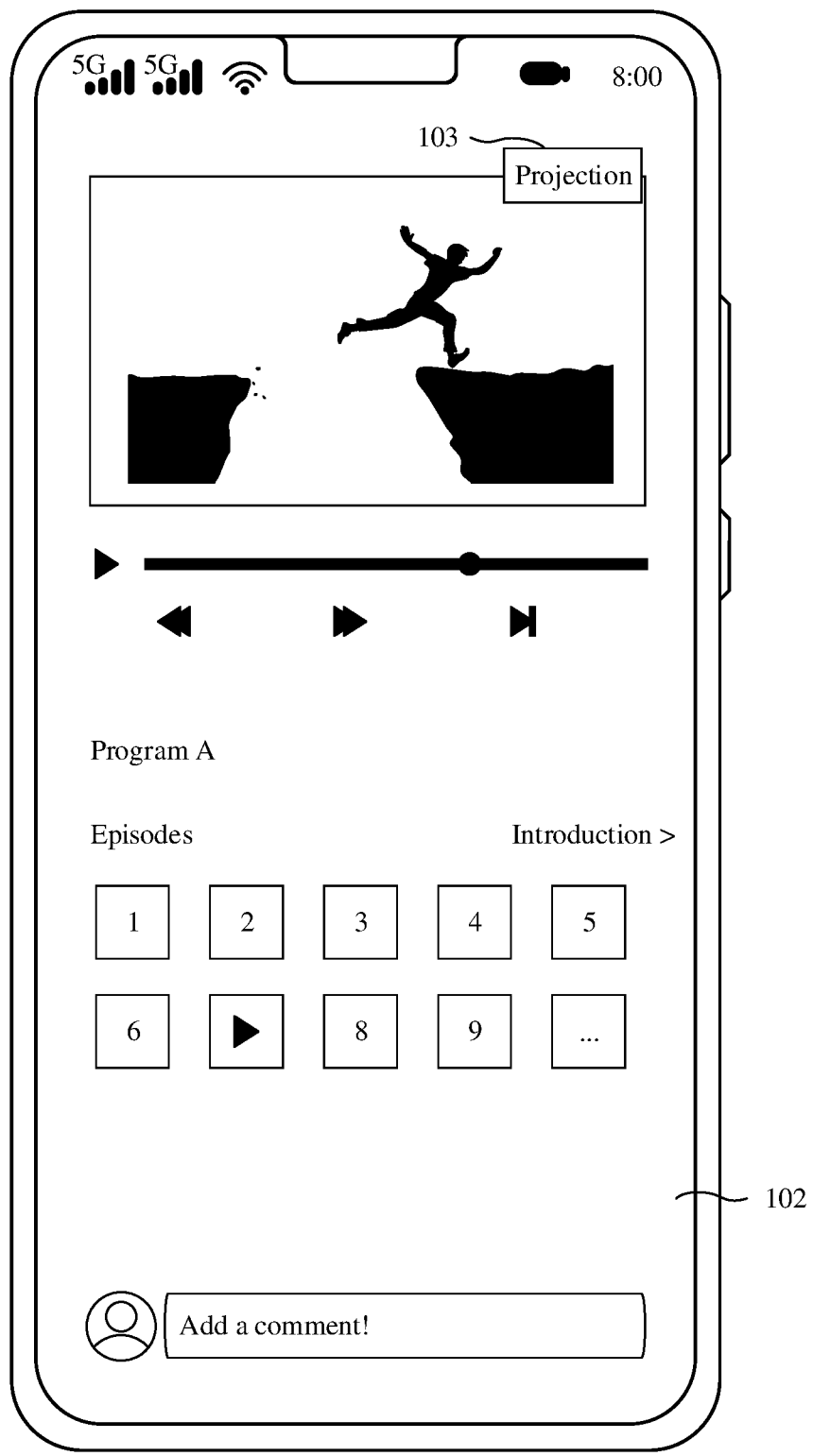
Figure 1C:
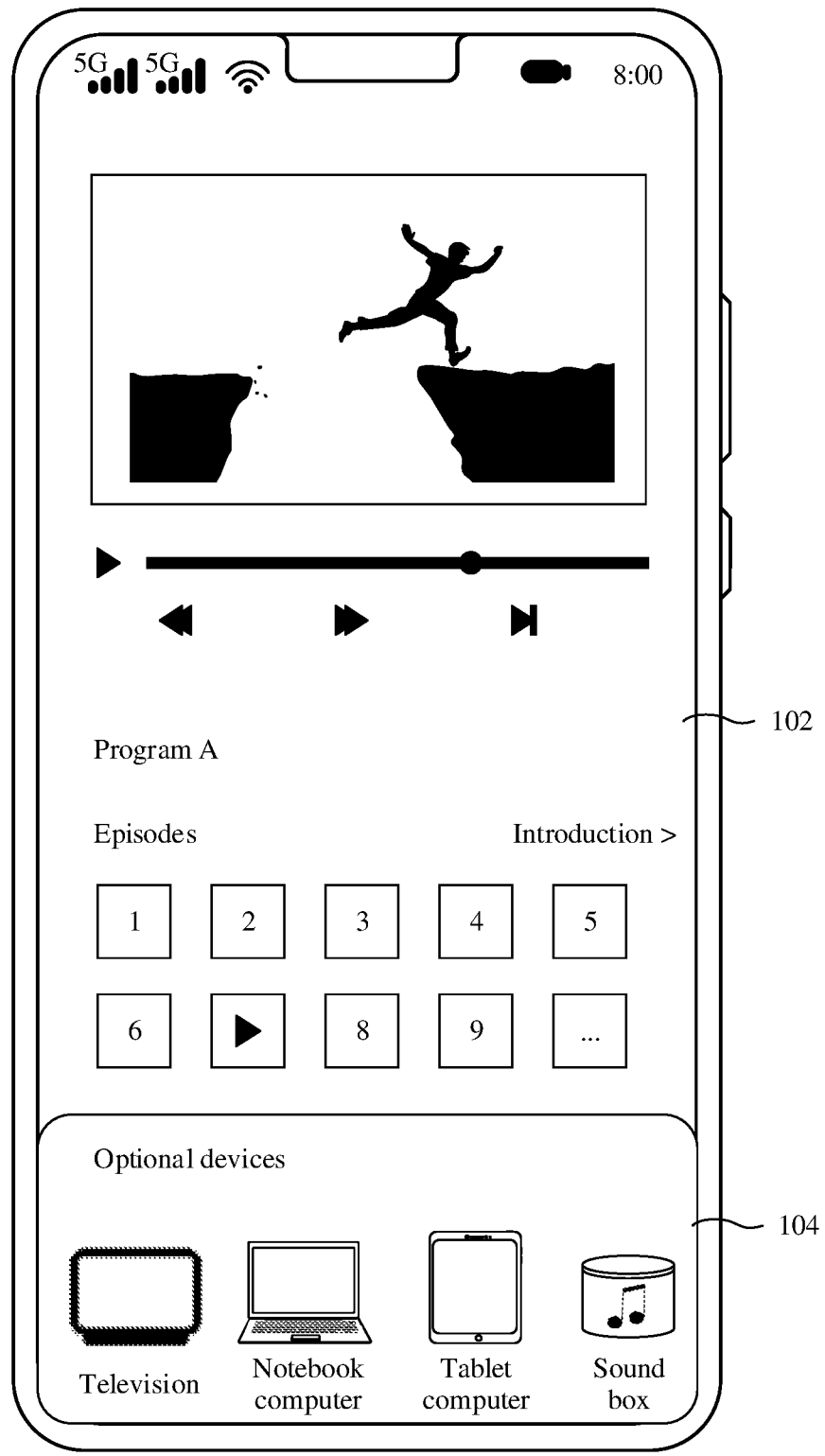
Figure 2:
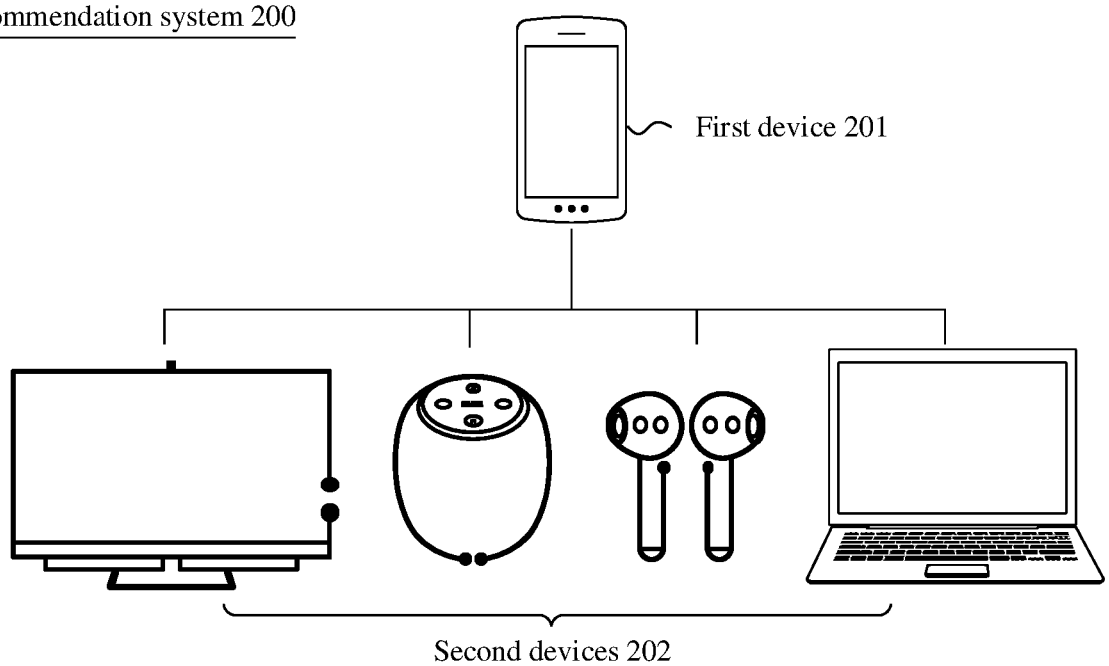
FIG. 2 is a schematic diagram 1 of an architecture of a recommendation system according to an embodiment of this application.

As shown in FIG. 2, the recommendation system 200 includes a first device 201. The first device 201 is configured to provide source data such as a to-be-played video, audio, a document, a link, or a picture. The source data provided by the first device 201 may be locally stored in the first device 201, or the source data provided by the first device 201 may be obtained by the first device 201 from a server or another device.

Still as shown in FIG. 2, the recommendation system 200 further includes one or more second devices 202 associated with the first device 201. For example, the second device 202 may be a device located in a same communication network (for example, a Wi-Fi network) as the first device 201. For another example, the second device 202 may be a device that logs in to a same account (for example, a Huawei account) as the first device 201.

For example, the first device 201 or the second device 202 may be specifically a mobile phone, a tablet computer, a television (which may also be referred to as a Vision, a large-screen device, or the like), a notebook computer, an ultra-mobile personal computer (Ultra-mobile Personal Computer, UMPC), a handheld computer, a netbook, a personal digital assistant (Personal Digital Assistant, PDA), a wearable electronic device, a vehicle-mounted device (which may also be referred to as a head unit), a virtual reality device, or the like. This is not limited in this embodiment of this application.

An application (referred to as a chat app below) having a chat function may be installed in the first device 201. A user may use the chat app to exchange a chat message with a chat object such as an added friend, a group, or a stranger that is not added in the chat app. Certainly, the user may alternatively use the chat app to exchange a chat message with a chat object such as an official account, a robot, or an applet provided by the chat app. In a subsequent embodiment, a chat object who exchanges a chat message with a user in a chat app is uniformly referred to as a contact.

In this embodiment of this application, when the user exchanges a chat message with a contact in the chat app by using the first device 201, the first device 201 may select, from the one or more second devices 202 based on specific content in the chat message, a recommended device suitable for opening the content, and recommend, in the chat app, the selected recommended device to the user, so that the user opens related content in the chat message by using the recommended device recommended by the chat app.

For example, when the chat message includes a video or a video link (for example, a video card), the first device 201 may determine a television or a tablet in the second device 202 as the recommended device. For another example, when the chat message includes audio or an audio link (for example, a music card), the first device 201 may determine a sound box or a head unit in the second device 202 as the recommended device. Alternatively, when the second device 202 includes both a sound box and a television, the first device 201 may further determine the sound box as a recommended device for audio content in the chat message, and determine the television as a recommended device for a video image in the chat message. In other words, there are two recommended devices: the sound box and the television.

In other words, after the user receives a chat message in the chat app by using the first device 201, the chat app may present, to the user, a recommended device related to content in the chat message. Subsequently, if it is detected that the user confirms to use the recommended device (for example, a television) recommended by the chat app, the first device 201 may indicate the television to open related content in the chat message. In this way, by using the chat message in the chat app as an entry, the user can quickly open the content in the chat message in the device recommended by the chat app, so that the content in the chat message can be played across devices quickly, and user experience is improved.

Figure 3:
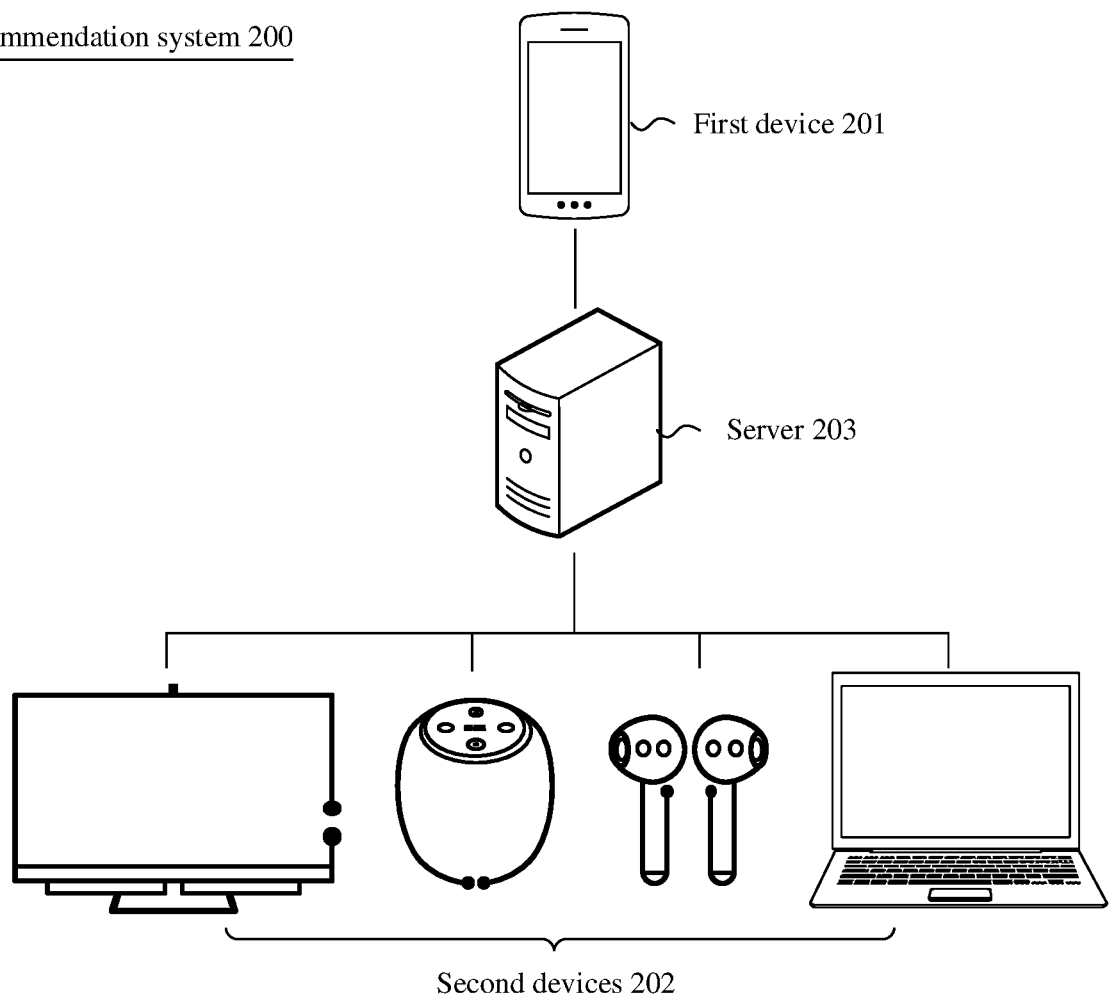
FIG. 3 is a schematic diagram 2 of an architecture of a recommendation system according to an embodiment of this application.

In some embodiments, as shown in FIG. 3, the recommendation system 200 may further include one or more servers 203. For example, the first device 201 may query, from the server 203, the one or more second devices 202 associated with the first device 201. For another example, when the chat message includes a video link (for example, a video card) or an audio link (for example, a music card), the first device 201 may further obtain a corresponding video or corresponding audio from the server 203. For another example, after the user selects a device (for example, a television) from recommended devices recommended by the chat app, the first device 201 may further send an indication message to the server 203, to indicate the server 203 to deliver, to the television, an instruction for playing related content in the chat message. Further, the server 203 may send, to the television in response to the indication message, the instruction for playing related content in the chat message, so that the content in the chat message can be played across devices.

A method in which the first device 201 reminds the user of a recommended device based on the content in the chat message is described in detail in a subsequent embodiment with reference to a specific example. Therefore, details are not described herein.

Figure 4:
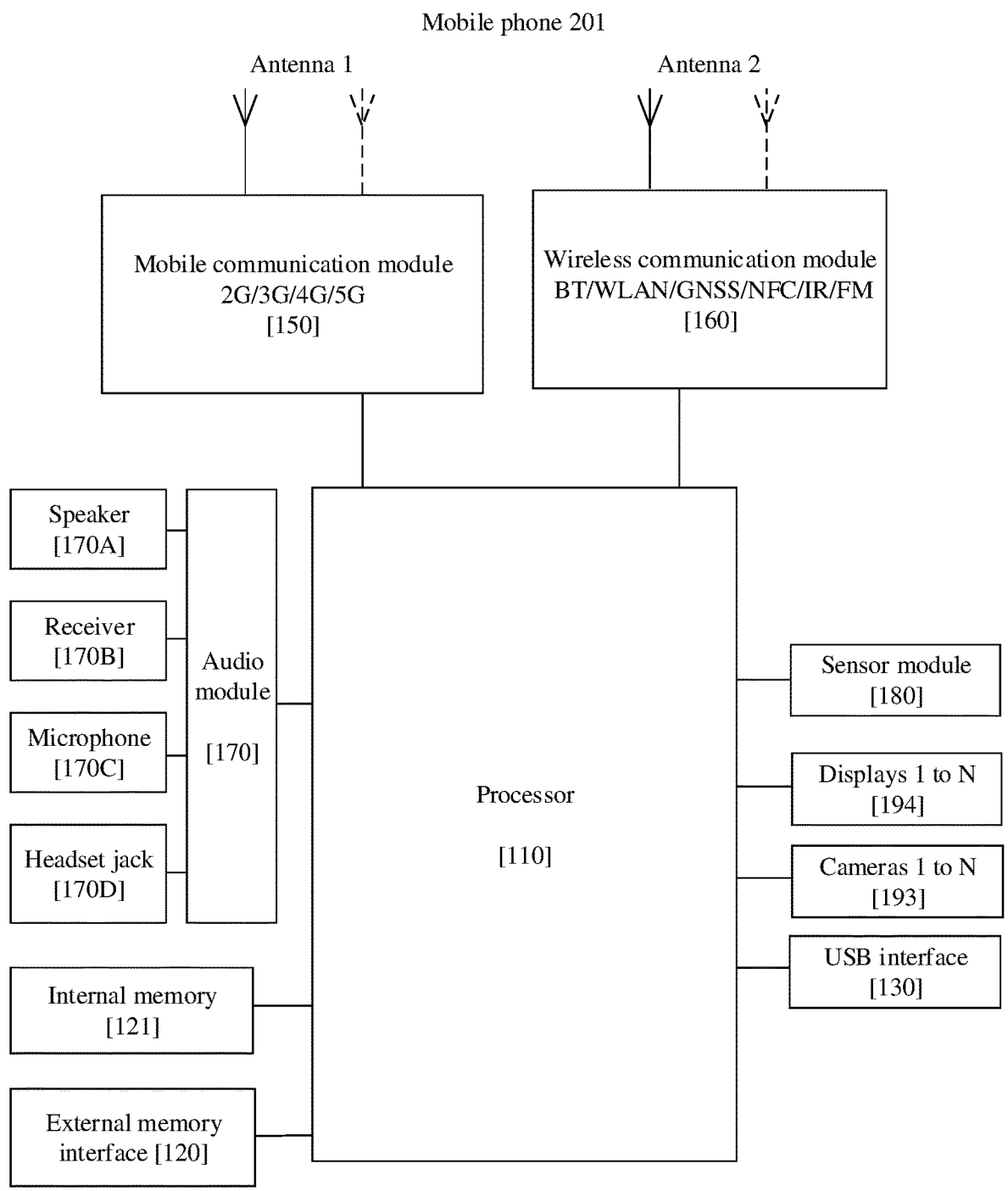
FIG. 4 is a schematic diagram 1 of a structure of an electronic device according to an embodiment of this application.

An example in which a mobile phone is still used as the first device 201 in the recommendation system 200 is used. FIG. 4 is a schematic diagram of a structure of the mobile phone.

The mobile phone may include a processor no, an external memory interface 120, an internal memory 121, a universal serial bus (universal serial bus, USB) interface 130, an antenna 1, an antenna 2, a mobile communication module 150, a wireless communication module 160, an audio module 170, a speaker 170A, a receiver 170B, a microphone 170C, a headset jack 170D, a sensor module 180, and the like.

It may be understood that the structure illustrated in this embodiment of the present invention does not constitute a specific limitation on the mobile phone. In other embodiments of this application, the mobile phone may include more or fewer components than those shown in the figure, or combine some components, or split some components, or have a different component arrangement. The components shown in the figure may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor no. If the processor 110 needs to use the instructions or the data again, the processor no may directly invoke the instructions or the data from the memory. In this way, repeated access is avoided, waiting time of the processor no is reduced, and system efficiency is improved.

A wireless communication function of the mobile phone may be implemented by using the antenna 1, the antenna 2, the mobile communication module iso, the wireless communication module 160, the modem processor, the baseband processor, and the like.

The antenna 1 and the antenna 2 are configured to transmit and receive electromagnetic wave signals. Each antenna in the mobile phone may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication that is applied to the mobile phone and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor no. In some embodiments, at least some functional modules of the mobile communication module 150 and at least some modules of the processor no may be disposed in a same component.

The wireless communication module 160 may provide a wireless communication solution that is applied to the mobile phone and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through an antenna 2, performs frequency modulation and filtering processing on the electromagnetic wave signal, and sends a processed signal to the processor no. The wireless communication module 160 may further receive a to-be-sent signal from the processor no, perform frequency modulation and amplification on the signal, and convert the signal into an electromagnetic wave for radiation through the antenna 2.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone implements a display function by using the GPU, the display 194, the application processor, and the like. The GPU is a microprocessor for image processing, and is connected to the display 194 and the application processor. The GPU is configured to: perform mathematical and geometric calculation, and render an image. The processor no may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is pressed, and a light ray is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion that are of the image. The ISP may further optimize parameters such as exposure and color temperature that are of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge-coupled device (charge-coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the mobile phone may include one or N cameras 193, where N is a positive integer greater than 1.

The digital signal processor is configured to process a digital signal, and may process another digital signal in addition to a digital image signal. For example, when the mobile phone selects a frequency, the digital signal processor is configured to perform Fourier transform on frequency energy, and the like.

The video codec is configured to compress or decompress a digital video. The mobile phone may support one or more video codecs. In this way, the mobile phone may play or record videos in a plurality of encoding formats, for example, moving picture experts group (moving picture experts group, MPEG)-1, MPEG-2, MPEG-3, and MPEG-4.

The external memory interface 120 may be configured to connect to an external storage card, for example, a micro SD card, to extend a storage capability of the mobile phone. The external storage card communicates with the processor no through the external memory interface 120, to implement a data storage function. For example, files such as music and a video are stored in the external storage card.

The internal memory 121 may be configured to store computer executable program code, where the executable program code includes instructions. The processor no runs the instructions stored in the internal memory 121, to perform various function applications and data processing of the mobile phone. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the mobile phone. In addition, the internal memory 121 may include a high-speed random access memory, or may include a non-volatile memory, such as at least one magnetic disk storage device, a flash memory, or a universal flash storage (universal flash storage, UFS).

The mobile phone may implement an audio function by using the audio module 170, the speaker 170A, the receiver 170B, the microphone 170C, the headset port 170D, the application processor, and the like. For example, a music playing function and a recording function are implemented.

The audio module 170 is configured to convert digital audio information into an analog audio signal output, and is also configured to convert an analog audio input into a digital audio signal. The audio module 170 may be further configured to: encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone may listen to music or answer a hands-free call by using the speaker 170A.

The receiver 170B, also referred to as an "earpiece", is configured to convert an audio electrical signal into a sound signal. When a call is answered or voice information is listened to by using the mobile phone, the receiver 170B may be put close to a human ear to listen to a voice.

The microphone 170C, also referred to as a "mike" or a "microphone", is configured to convert a sound signal into an electrical signal. When making a call or sending voice information, a user may place the mouth of the user near the microphone 170C to make a sound, to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the mobile phone may further include a charging management module, a power management module, a battery, a button, an indicator, one or more SIM card interfaces, and the like. This is not limited in this embodiment of this application.

A software system of the mobile phone may use a layered architecture, an event-driven architecture, a microkernel architecture, a microservice architecture, or a cloud architecture. In this embodiment of this application, an Android system with a layered architecture is used as an example to describe a software structure of the mobile phone.

Figure 5:
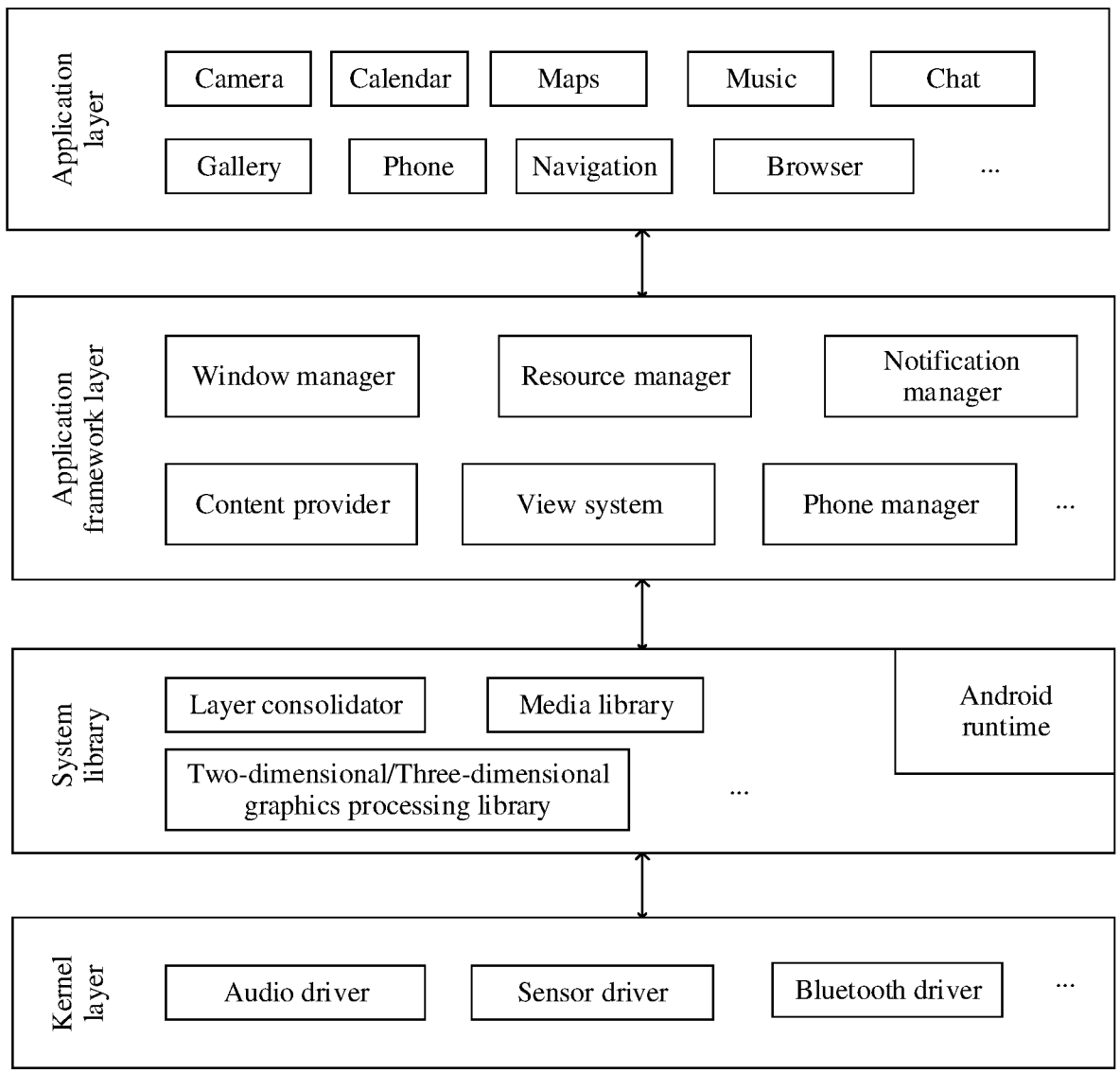
FIG. 5 is a schematic diagram of an architecture of an operating system of an electronic device according to an embodiment of this application.

FIG. 5 is a block diagram of a software structure of the mobile phone according to an embodiment of this application.

In the layered architecture, software is divided into several layers, and each layer has a clear role and a clear task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 5, apps (application, application) such as Phone, Memo, Browser, Contacts, Camera, Gallery, Calendar, Maps, Bluetooth, Music, Videos, and Messages may be installed at the application layer.

The application framework layer provides an application programming interface (application programming interface, API) and a programming framework for an application at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system may be used to construct a display interface of an application. Each display interface may include one or more controls. Generally, the control may include interface elements such as an icon, a button, a menu, a tab, a text box, a dialog box, a status bar, a navigation bar, and a widget (Widget).

The phone manager is configured to provide a communication function of the mobile phone, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification-type message. The displayed information may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running in the background, or may be a notification that appears on a screen in a form of a dialog window. For example, text information is prompted in the status bar, a prompt tone is played, vibration is performed, or an indicator light blinks.

As shown in FIG. 5, the system library may include a plurality of functional modules, for example, a layer integrator (SurfaceFlinger), a media library (Media Libraries), a three-dimensional graphics processing library (for example, OpenGL ES), and a 2D graphics engine (for example, SGL). The SurfaceFlinger is configured to: manage a display subsystem and provide fusion of 2D and 3D layers for a plurality of applications. The media library supports playback and recording in a plurality of commonly used audio and video formats, static image files, and the like. The media library may support a plurality of audio and video encoding formats, for example, MPEG4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The kernel layer is a layer between hardware and software. The kernel layer includes at least a camera driver, an audio driver, a sensor driver, and the like. This is not limited in this embodiment of this application.

In this embodiment of this application, a chat app having a chat function is installed at an application layer of the mobile phone. For example, the chat app may be a built-in system-level application of the mobile phone, or may be a third-party application such as WeChat® or Microblog®. After receiving a chat message sent by a contact, the chat app in the mobile phone may recommend, to the user, an electronic device suitable for opening related content in the chat message, so that the user can conveniently open the content in the chat message by using the electronic device recommended by the chat app.

Figure 6:
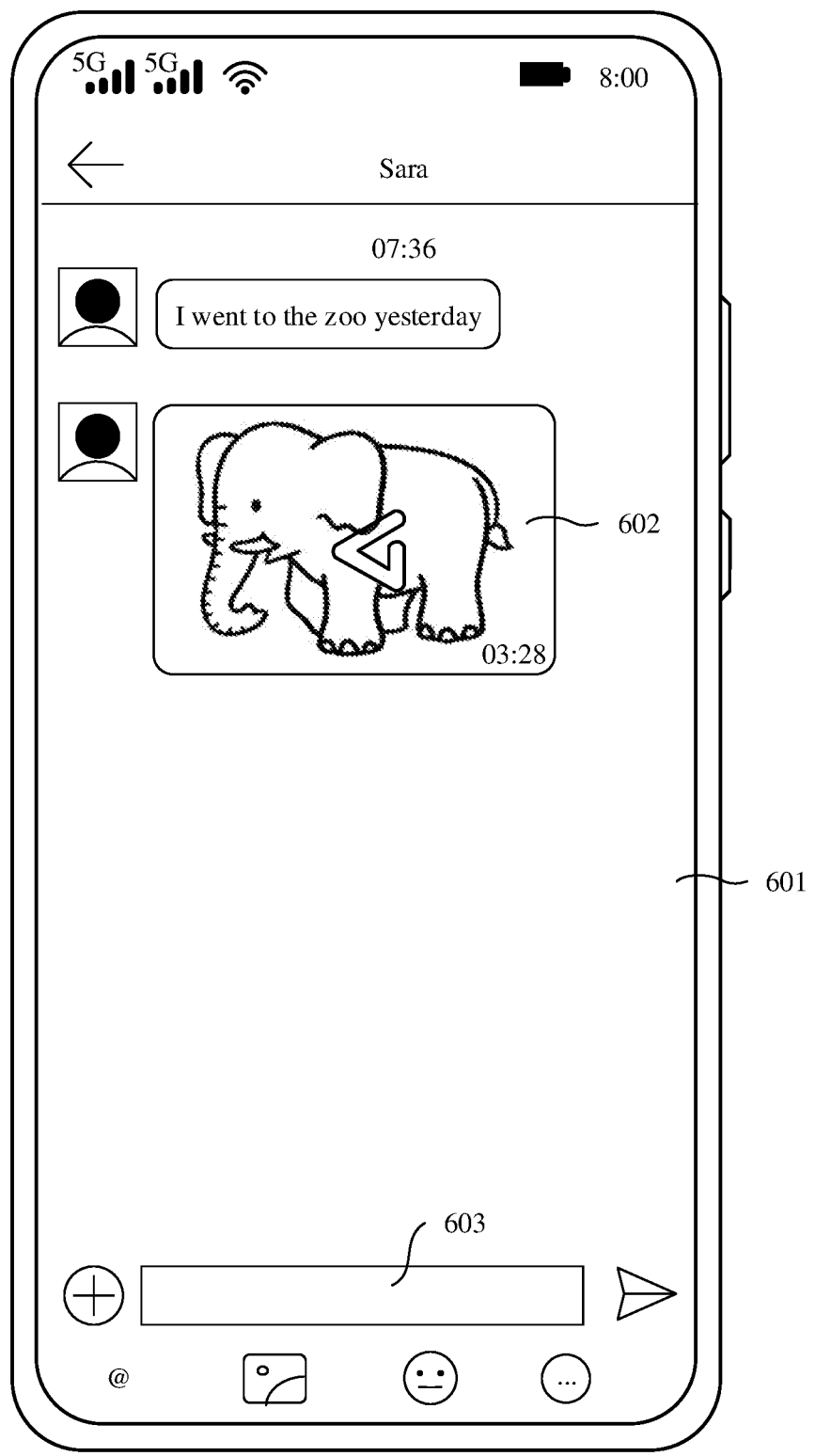
FIG. 6 is a schematic diagram 1 of an application scenario of a device recommendation method according to an embodiment of this application.

For example, as shown in FIG. 6, when the user chats with a contact Sara by using the chat app in the mobile phone, the mobile phone may display, in the chat app, a chat interface 601 between the user and the contact Sara. In addition, the chat app may obtain, in real time, a last chat message 602 that is sent by the contact Sara and that is on the chat interface 601. Further, the chat app may identify whether the chat message 602 includes preset target content such as a video, audio, a picture, a document, or a preset card (for example, a video card or a music card).

In this embodiment of this application, the mobile phone may prestore correspondences between different target content and recommended devices, that is, correspondences between different types of content and different recommended devices. As shown in Table 1, when the target content is a video or a video card from a video app, corresponding recommended devices may include a television and a tablet computer. When the target content is audio or a music card from a music app, corresponding recommended devices may include a television, a sound box, and a head unit. When the target content is a sports and health card from a sports and health app, a corresponding recommended device may include a television. When the target content is a picture, a corresponding recommended device may include a television. When the target content is a document, a corresponding recommended device may include a printer. In other words, for a characteristic of each type of target content, a recommended device suitable for presenting the target content is set for each type of target content.

TABLE 1

| Target content | Recommended device |
| --- | --- |
| Video card and video | Television and tablet computer |
| Music card and audio | Television, sound box, and head unit |
| Sports and health card | Television |
| Picture | Television |
| Document | Printer |

The correspondences shown in Table 1 may be prestored in the mobile phone when the mobile phone is delivered from a factory. Alternatively, the mobile phone may obtain the foregoing correspondences from a server. Alternatively, the mobile phone may obtain the foregoing correspondences from an electronic device such as another mobile phone. This is not limited in this embodiment of this application.

In some embodiments of this application, the correspondences shown in Table 1 may be further dynamically updated. For example, after the user logs in to a plurality of devices by using a same account, the server may record operation records of the user in the plurality of devices. For example, if it is detected that the user often uses a head unit to play audio from the mobile phone, the server may set, in the foregoing correspondences, a recommended device corresponding to the audio as the head unit. Alternatively, if the recommended devices corresponding to the audio include a plurality of devices such as a head unit and a sound box, the server may set a priority of the head unit to be higher than a priority of the sound box. Further, the server may send updated correspondences between the target content and the recommended devices to the mobile phone, so that the correspondences stored in the mobile phone correspond to use habits of the user, accuracy of subsequently recommending a recommended device to the user is improved, and user experience is improved.

Certainly, the mobile phone or the server may further add new target content and a recommended device to the foregoing correspondences by using some artificial intelligence algorithms, delete old target content and a recommended device, modify a recommended device corresponding to target content, or the like. This is not limited in this embodiment of this application.

For example, the chat message 602 includes a video A (that is, first content). The chat app in the mobile phone may determine, by querying Table 1, that recommended devices corresponding to the video A in the chat message 602 include two types of electronic devices: a television and a tablet computer. In this case, the mobile phone may obtain one or more electronic devices currently associated with the mobile phone. The one or more electronic devices associated with the mobile phone may be electronic devices that access a same communication network (for example, a Wi-Fi network) as the mobile phone, or may be electronic devices that log in to a same account as the mobile phone.

Figure 7:
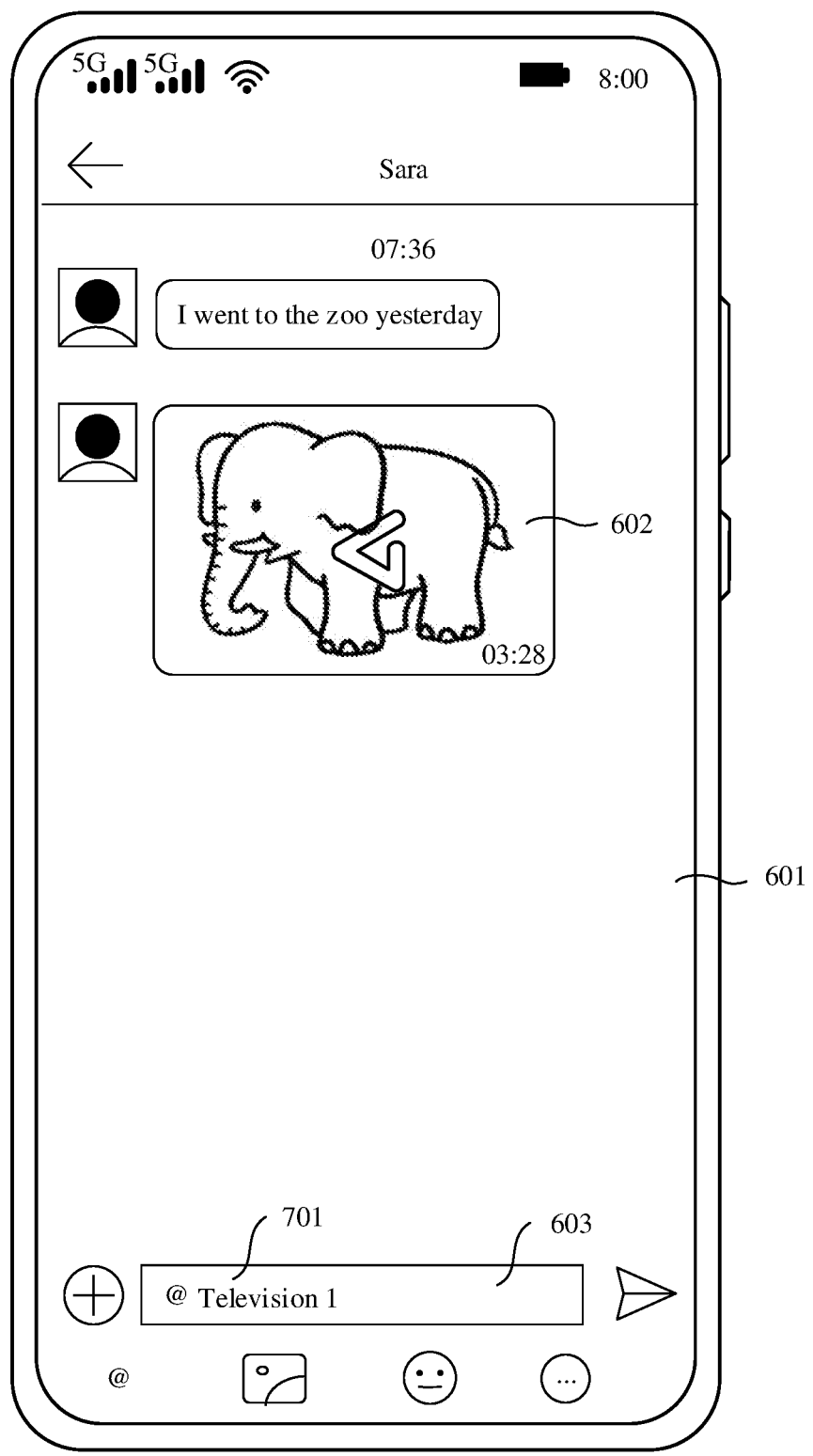
FIG. 7 is a schematic diagram 2 of an application scenario of a device recommendation method according to an embodiment of this application.

For example, the mobile phone may obtain, from the server, the electronic devices that log in to a same account as the mobile phone. The electronic devices include a television 1, a sound box 1, a printer 1, and an air purifier 1. Further, the mobile phone may search the television 1, the sound box 1, the printer 1, and the air purifier 1 for the two types of electronic devices: a television and a tablet computer. When the mobile phone determines that the television 1 is an electronic device of a television type, as shown in FIG. 7, the chat app in the mobile phone may display the television 1 as a recommended device in an input box 603 on the chat interface 601.

Alternatively, in some embodiments, the mobile phone may find, in electronic devices that currently log in to a same account as the mobile phone, that a plurality of electronic devices may be recommended to the user as recommended devices. For example, if the mobile phone, the television 1, and the tablet computer 1 all log in to a same account, the mobile phone may determine, based on the correspondences shown in Table 1, that recommended devices corresponding to the video A in the chat message 602 include the television 1 and the tablet computer 1. In this case, the mobile phone may select one of the television 1 and the tablet computer 1 as a recommended device finally presented to the user. For example, the mobile phone may use an online device in the television 1 and the tablet computer 1 as a recommended device finally presented to the user. For another example, the mobile phone may use a device that is frequently used in the television 1 and the tablet computer 1 as a recommended device finally presented to the user. This is not limited in this embodiment of this application.

An example in which the television 1 is a recommended device determined by the mobile phone is still used. As shown in FIG. 7, the chat app may automatically input first prompt information 701 of "@television 1" in the input box 603 in a form of "@+device name". The chat app prompts, by using the first prompt information 701, the user to use the device, namely, the television 1, to play the video A in the chat message 602. The first prompt information 701 may prompt, in a manner such as marking gray, the user that the first prompt information 701 is content automatically input by the chat app for the user.

In this way, in a process in which the user chats with the contact Sara in the chat app, the chat app may automatically recommend, in the input box 603 based on a last chat message (for example, the chat message 602) sent by the contact Sara, a recommended device that matches video content in the chat message 602 to the user. Subsequently, the user may open, based on the first prompt information 701, the video A in the chat message 602 by using the recommended device recommended by the chat app.

Still as shown in FIG. 7, in the chat app, when the first prompt information 701 is input in the input box 603, the input box 603 has not obtained an input focus (input focus). When it is detected that the user taps the input box 603, the input box 603 obtains an input focus. After the input box 603 obtains the input focus, the mobile phone may display a cursor in the input box 603, to prompt the user to input corresponding content in the input box 603. In addition, after the input box 603 obtains the input focus, the mobile phone may display an input method keyboard on the chat interface 601, so that the user can input corresponding content in the input box 603 by using the input method keyboard.

For example, the chat app may set that after the first prompt information 701 is displayed in the input box 603, the first prompt information 701 stays in the input box 603 for a preset time period, for example, stays for 3 seconds. If it is not detected that the user taps the input box 603 in a process in which the first prompt information 701 stays in the input box 603 for 3 seconds, it indicates that the user may not need to play the video A by using the recommended device recommended by the chat app. Further, the chat app may hide the first prompt information 701 in the input box 603, and the user may normally use the input box 603 to input a to-be-sent chat message. In this way, the first prompt information 701 recommended by the chat app in the input box 603 does not disturb a process in which the user normally inputs a chat message in the input box 603.

Certainly, the chat app may alternatively display the first prompt information 701 at another location on the chat interface 601. For example, the chat app may display the first prompt information 701 near the input box 603. This is not limited in this embodiment of this application.

Figure 8:
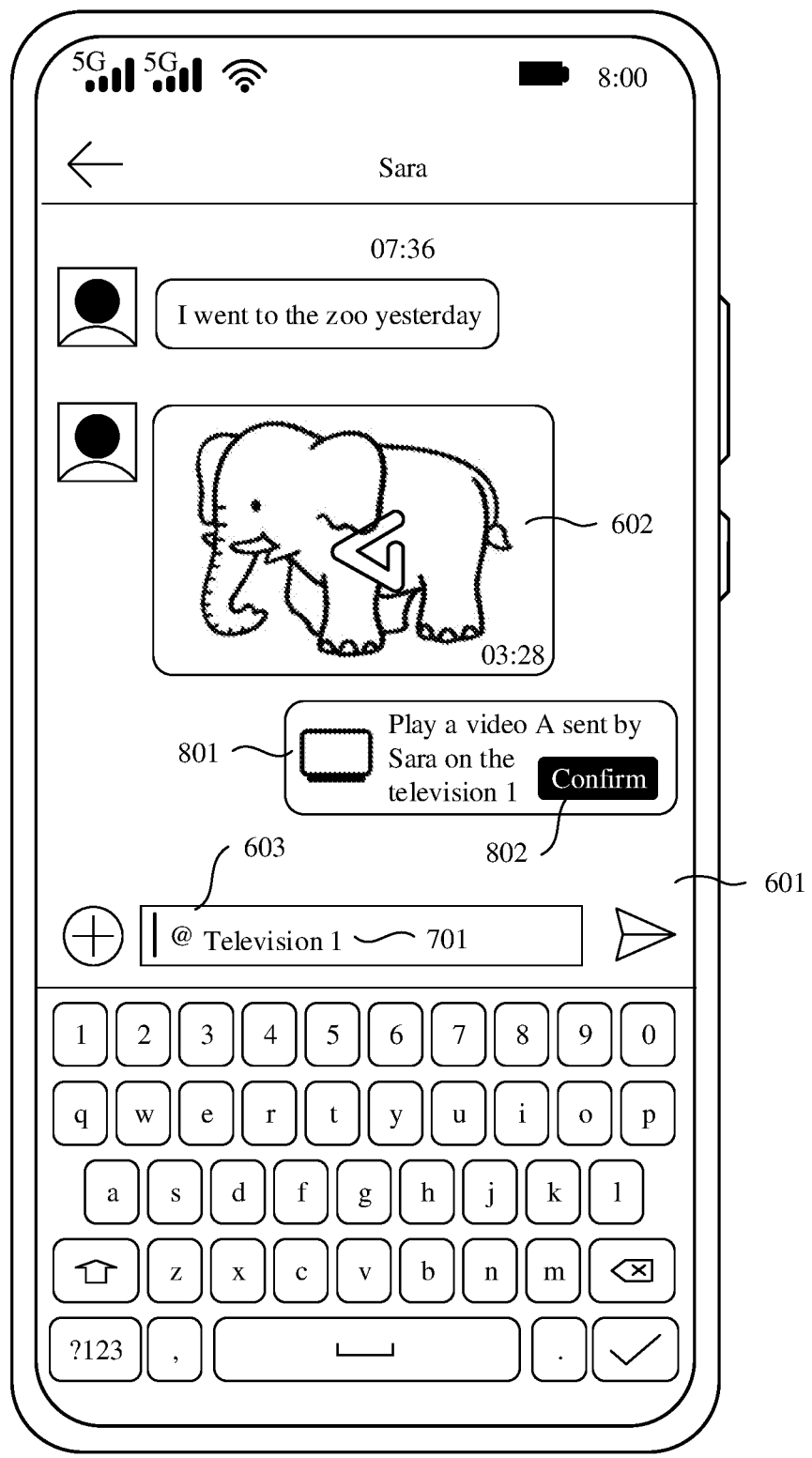
FIG. 8 is a schematic diagram 3 of an application scenario of a device recommendation method according to an embodiment of this application.

After the chat app displays the first prompt information 701 in the input box 603, if the chat app detects that the user taps the input box 603 before the first prompt information 701 is hidden in the input box 603, it indicates that the user may expect to play the video content in the chat message 602 by using the television 1 recommended by the chat app. The chat app may determine that the user inputs an operation of confirming the first prompt information 701. In this case, as shown in FIG. 8, the chat app may further display second prompt information 801 on the chat interface 601. The second prompt information 801 is used to prompt the user to play the video A in a recommended device (for example, the television 1) found by the chat app.

Figure 9:
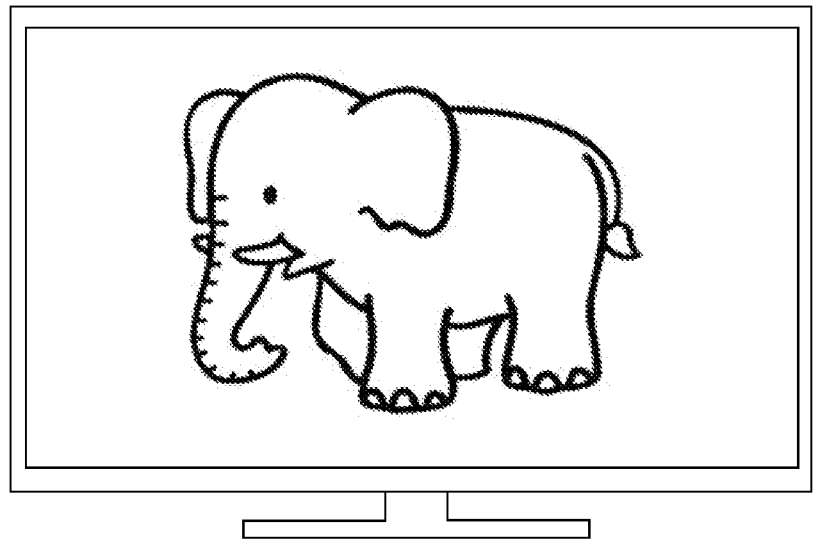
FIG. 9 is a schematic diagram 4 of an application scenario of a device recommendation method according to an embodiment of this application.

For example, a confirmation button 802 may be set in the second prompt information 801. If it is detected that the user taps the confirmation button 802, it indicates that the user confirms to use the recommended device (that is, the television 1) to play the video A in the chat message 602. The chat app may determine that the user inputs an operation of confirming the second prompt information 801. In this case, as shown in FIG. 9, the mobile phone may indicate the television 1 to play the video A in the chat message 602. Alternatively, if it is detected that the user taps the second prompt information 801, the chat app may also determine that the user inputs an operation of confirming the second prompt information 801, and may also trigger the mobile phone to indicate the television 1 to play the video A in the chat message 602.

For example, the mobile phone may establish a communication connection to the television 1 based on an identifier of the television 1. Further, the mobile phone may send the video A to the television 1 by using a projection function, and the television 1 plays the video A. For another example, the mobile phone may send a play request to the server, where the play request may include the identifier of the television 1 and the video A. Further, in response to the play request, the server may send, to the television 1 based on the identifier of the television 1, a play instruction for playing the video A, so that the television 1 may play the video A according to the play instruction. In some embodiments, if the server finds, when sending the play instruction to the television 1, that the television 1 is not powered on, the server may buffer the play instruction for a period of time (for example, seven days). Within the seven days, if the server detects that the television 1 is powered on, the server may send the buffered play instruction to the television 1. Certainly, if the server does not detect that the television 1 is powered on within seven days, the server may delete the buffered play instruction, and no longer send the play instruction to the television 1.

In some embodiments, after the mobile phone detects that the user taps the confirmation button 802 or taps the second prompt information 801, the mobile phone may further search, based on the identifier of the television 1 by using a near field communication function such as Bluetooth or Wi-Fi, whether nearby devices include the television 1. For example, if the mobile phone finds, by using Bluetooth, that an identifier of the device 1 is the same as the identifier of the television 1, it indicates that the device 1 is the television 1. In this case, the television 1 is located near the mobile phone. Correspondingly, if the mobile phone does not find the identifier of the television 1 by using Bluetooth, it indicates that the television 1 selected by the user to play the video A is not located near the mobile phone at this moment.

Figure 10:
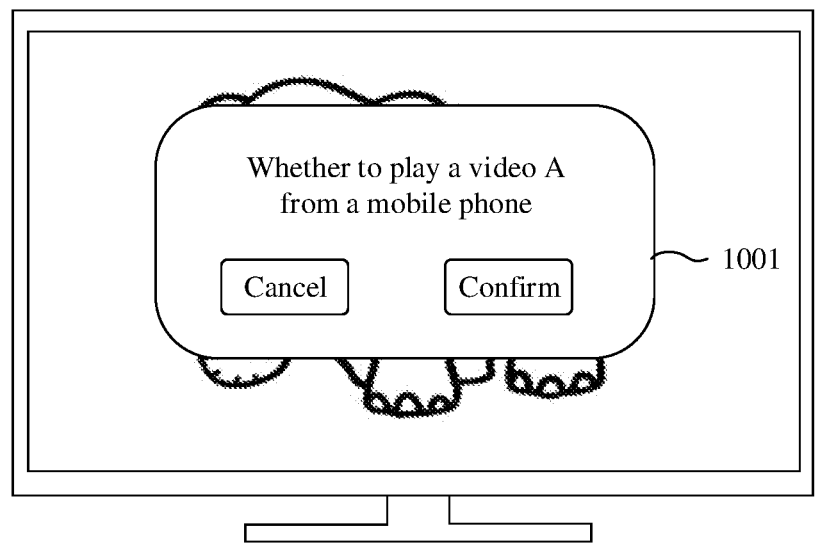
FIG. 10 is a schematic diagram 5 of an application scenario of a device recommendation method according to an embodiment of this application.

In this case, if the television 1 is located near the mobile phone, still as shown in FIG. 9, the mobile phone may directly indicate the television 1 to start to play the video A in the chat message 602. If the television 1 is not located near the mobile phone, to prevent the user from indicating, due to a misoperation, the television 1 to play the video A in the chat message 602, as shown in FIG. 10, the mobile phone may indicate the television 1 to display a pop-up window low, and ask, by using the pop-up window low, the user whether to play the video A from the mobile phone. If the television 1 receives an operation that the user confirms playing of the video A from the mobile phone, television 1 may start to play the video A in the chat message 602.

In some embodiments, after the chat app displays the second prompt information 801 on the chat interface 601, if it is not detected within a period of time (for example, 5 seconds) that the user taps the second prompt information 801 or the confirmation button 802 in the second prompt information 801, it indicates that the user may not need to use the recommended device recommended by the chat app to play the video A. In this case, the chat app may hide the second prompt information 801 and the first prompt information 701, that is, cancel a current device recommendation process.

Alternatively, after the chat app displays the first prompt information 701 in the input box 603 on the chat interface 601, if it is detected that the user inputs any character such as a character, an emoticon, or a number in the input box 603, it indicates that a purpose of tapping the input box 603 by the user is to input a to-be-sent chat message in the input box 603, instead of using the recommended device to play the video A in the chat message 602. In this case, the chat app may also hide the second prompt information 801 and the first prompt information 701, that is, cancel a current device recommendation process. In this way, a process in which the chat app presents the recommended device to the user does not conflict with a process in which the user chats with the contact by using the input box 603, and the user does not need to perform an additional operation on the recommended device (for example, "@Television 1" in the input box 603) displayed by the chat app to cancel the current device recommendation process. Therefore, an interaction process between the user and the chat app in the mobile phone is friendlier.

In the foregoing embodiment, an example in which the chat app recommends one recommended device (for example, the television 1) to the user in the input box 603 is used for description. In some embodiments, the chat app may alternatively recommend a plurality of recommended devices to the user in a combination manner.

Figure 11A:
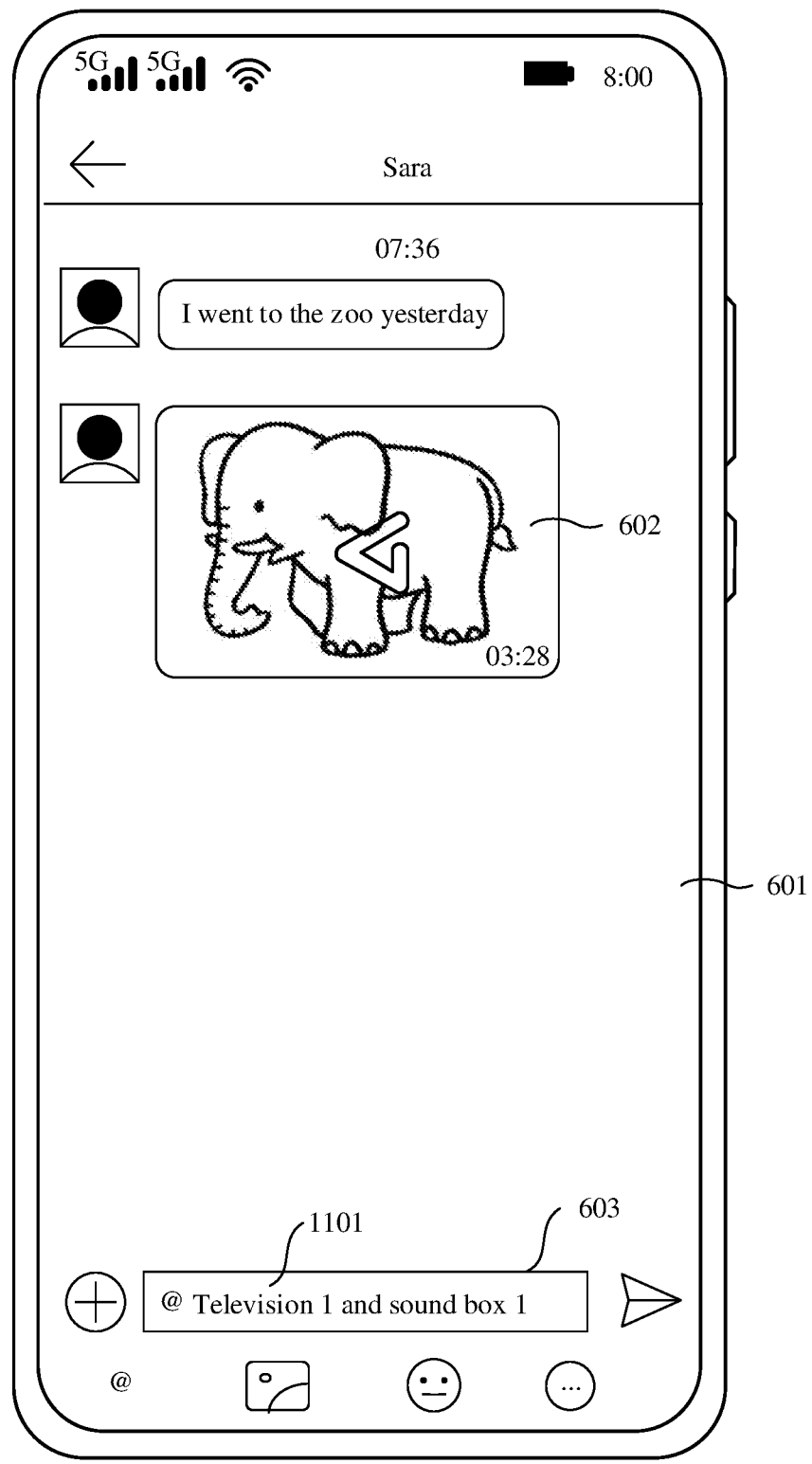
FIG. 11A and FIG. 11B are a schematic diagram 6 of an application scenario of a device recommendation method according to an embodiment of this application.
Figure 11B:
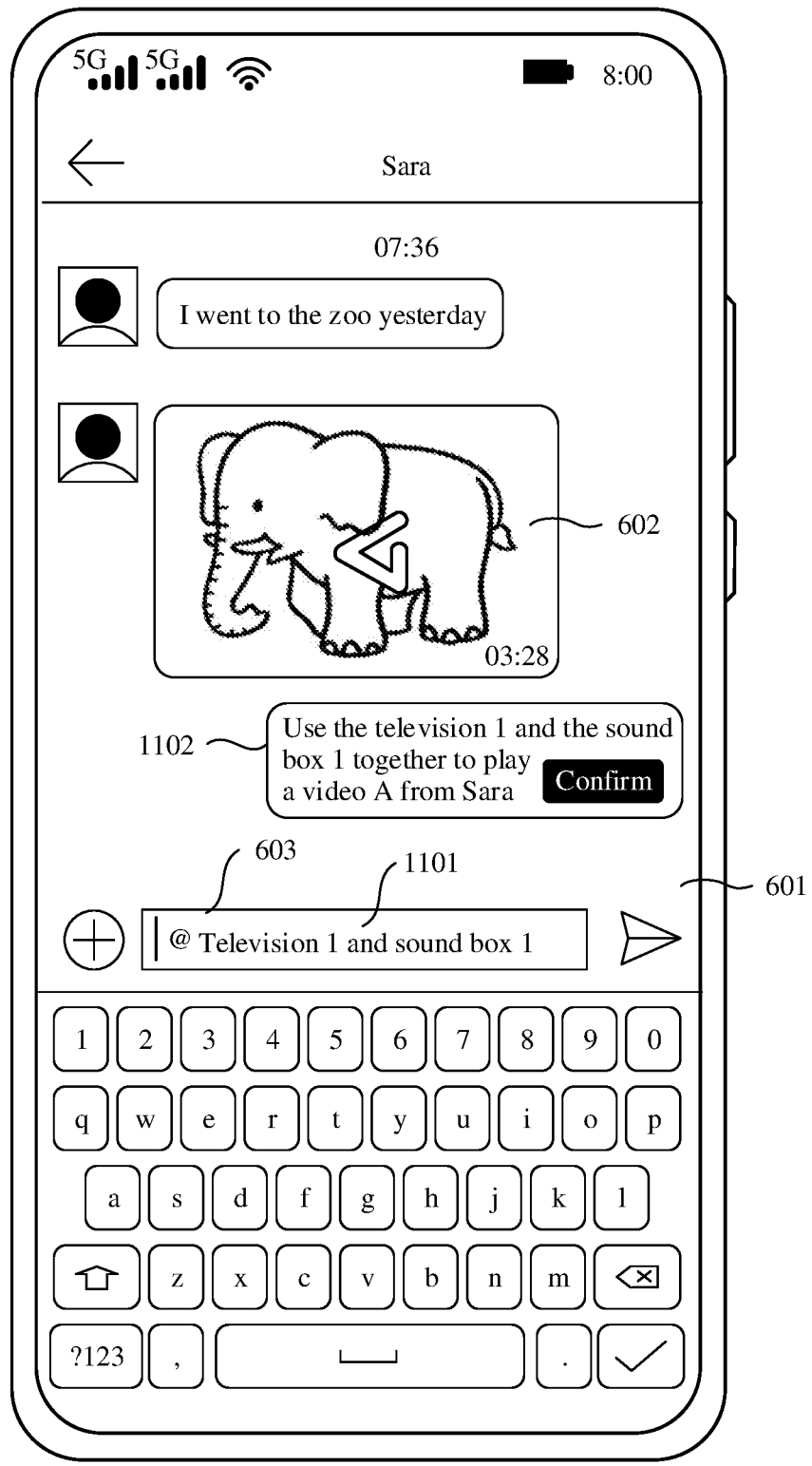

For example, when the target content in the chat message 602 is content of a video type, it may be set that the video content is played in a manner in which a television and a sound box work cooperatively. For example, the television may be configured to play a video picture in a video, and the sound box may be configured to play audio in the video. In this case, if the mobile phone detects that devices that currently log in to a same account as the mobile phone include the television 1 and the sound box 1, the mobile phone may recommend a combination of the television 1 and the sound box 1 to the user. As shown in FIG. 11A, after receiving the chat message 602 sent by the contact Sara, the chat app may display first prompt information 1101 of "@Television 1 and sound box 1" in the input box 603 on the chat interface 601. Subsequently, similar to that in the foregoing embodiment, as shown in FIG. 11B, if it is detected that the user taps the input box 603, the chat app may display the second prompt information 1102 on the chat interface 601. The second prompt information 1102 is used to prompt the user to cooperatively play the video A by using the television 1 and the sound box 1 that are recommended by the chat app. In this case, if it is detected that the user taps the confirmation button in the second prompt information 1102, the mobile phone may indicate the television 1 to play a video image in the video A. In addition, the mobile phone may indicate the sound box 1 to play the audio in the video A. In other words, the chat app may further recommend a plurality of recommended devices to the user based on the target content in the chat message, and present the target content in the chat message to the user through cooperation of the plurality of recommended devices.

In the foregoing embodiment, an example in which the target content in the chat message 602 is the video A is used for description. It may be understood that when the target content in the chat message 602 is content such as music, a picture, or a document, the chat app may also recommend, based on the correspondences shown in Table 1, a corresponding recommended device to the user according to the recommendation method provided in the foregoing embodiment.

Figure 12A:
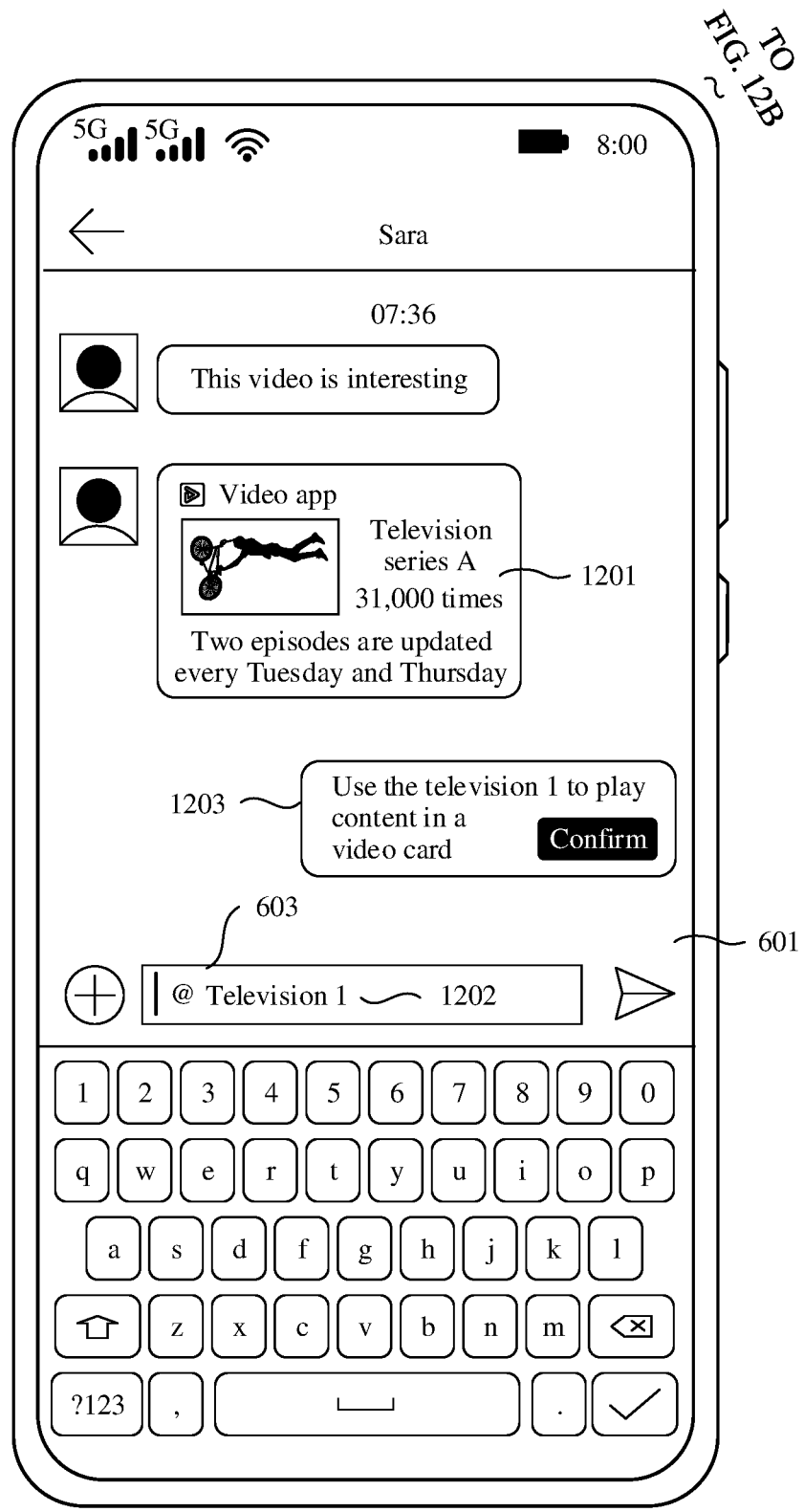
FIG. 12A and FIG. 12B are a schematic diagram 7 of an application scenario of a device recommendation method according to an embodiment of this application.
Figure 12B:
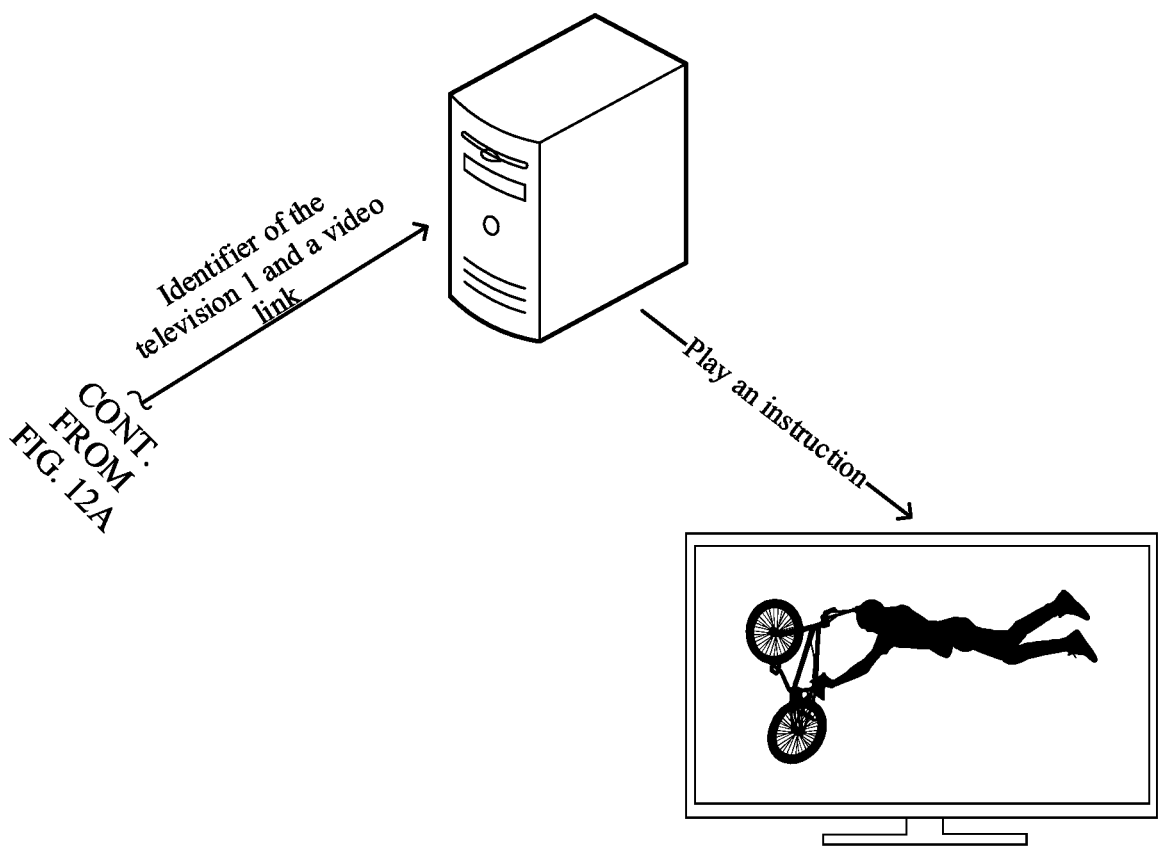

In some embodiments, a chat message sent by the contact may further include a chat message of a card type such as a video card, a music card, or a health and sports card. A chat message of this card type generally comes from a corresponding application, and a card generally carries a link of corresponding content. An example in which the user chats with the contact Sara in the chat app is still used. As shown in FIG. 12A and FIG. 12B, after the chat app receives, on the chat interface 601, a chat message 1201 sent by the contact Sara, the chat app may identify that the chat message 1201 includes a video card from a video app, where the video card carries a video link of a corresponding video in the video app. Further, the chat app may determine, based on the correspondences shown in Table 1, from devices that currently log in to a same account as the mobile phone, that a recommended device corresponding to the video card is the television 1. Still as shown in FIG. 12A and FIG. 12B, the chat app may use the television 1 as a recommended device to automatically input first prompt information 1202 of "@Television 1" in the input box 603.

Similar to that in the foregoing embodiment, if it is detected that the user taps the input box 603 on the chat interface 601, still as shown in FIG. 12A and FIG. 12B, the chat app may display second prompt information 1203 on the chat interface 601, to prompt the user to play video content in the video card by using the television 1 recommended by the chat app.

Subsequently, if it is detected that the user taps the confirmation button in the second prompt information 1203, still as shown in FIG. 12A and FIG. 12B, the chat app may send the identifier of the television 1 and the video link of the video card in the chat message 1201 to the server. The video link may be a link A used when the mobile phone plays a video in the video card, or may be a link B used when the television 1 plays a video in the video card. After the server receives the identifier of the television 1 and the video link of the video card, if the video link is the link B, the server may send a play instruction to the television 1 based on the identifier of the television 1, where the play instruction may carry the link B. In this way, after receiving the play instruction sent by the server, television 1 may open the corresponding video app based on the link B in the play instruction, and display a play interface of a corresponding video in the video app.

Alternatively, after the server receives the identifier of the television 1 and the video link of the video card, if the video link is the link A, the server may first obtain the link B used when the television 1 plays the video in the video card. Further, the server may add the link B to the play instruction and send the play instruction to the television 1. Similarly, after receiving the play instruction sent by the server, television 1 may open the corresponding video app based on the link B in the play instruction, and display a play interface of a corresponding video in the video app.

In other words, for a chat message of a card type, the chat app may also recommend a corresponding recommended device to the user based on the card type, so that the user can open specific content in the card by using the recommended device recommended by the chat app.

In the foregoing embodiment, an example in which the last chat message that is sent by the contact Sara and that is on the chat interface 601 in the chat app includes the target content (that is, the video A) is used for description. In some embodiments, if the chat app obtains that the last chat message sent by the contact Sara does not include the foregoing target content, for example, the last chat message sent by the contact Sara is a text message, the chat app may further continue to search for whether another message sent by the contact Sara includes the target content. In other words, the chat app may recommend, to the user based on the last chat message that includes the target content and that is sent by the contact Sara, a recommended device for playing content in the chat message.

Figure 13:
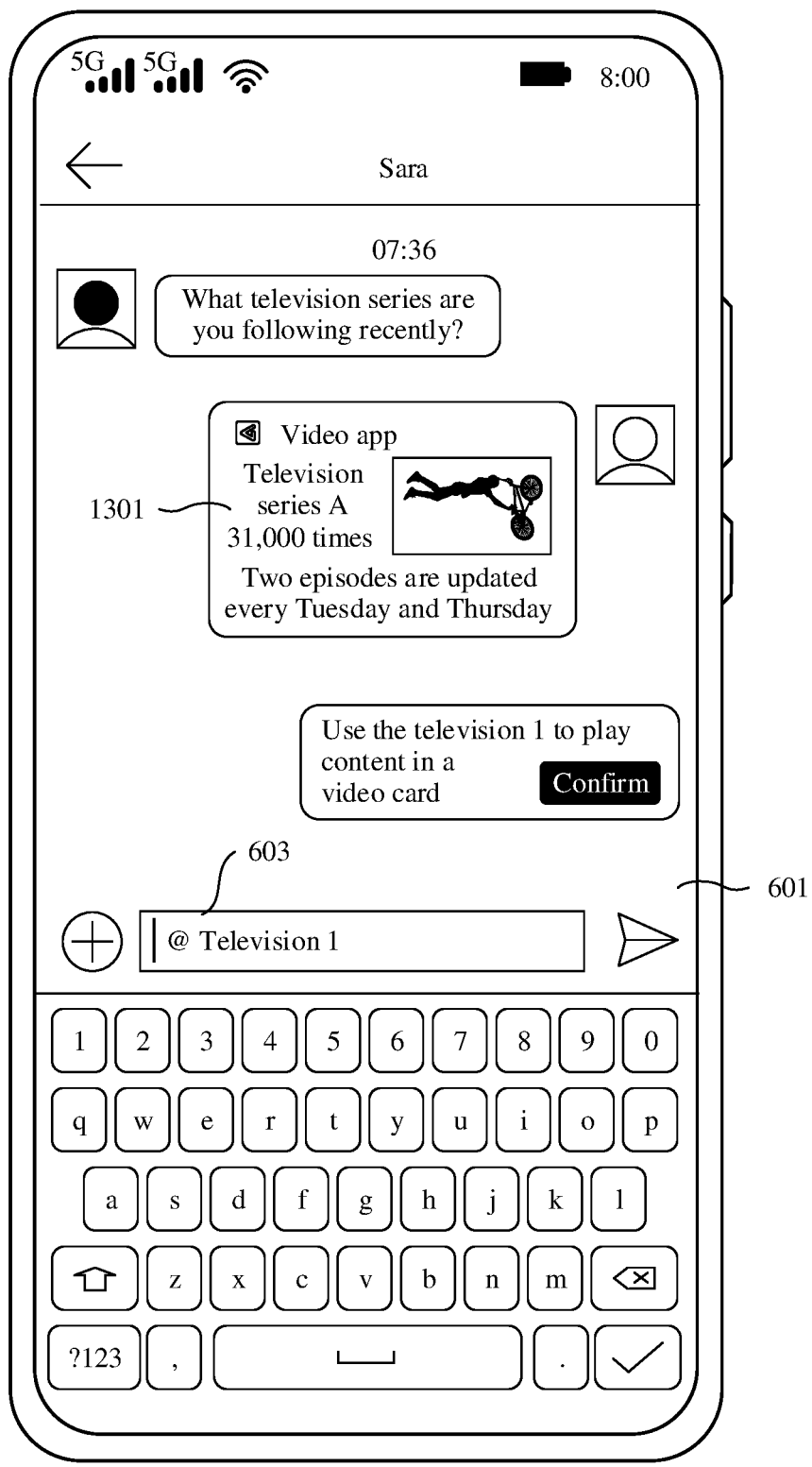
FIG. 13 is a schematic diagram 8 of an application scenario of a device recommendation method according to an embodiment of this application.

Alternatively, the chat app may recommend a recommended device to the user based on a chat message sent by the user (that is, a sender of the chat message). For example, as shown in FIG. 13, regardless of whether a last chat message 1301 on the chat interface 601 is sent by the user or sent by the contact Sara, when the chat message 1301 includes the target content, the chat app may determine a corresponding recommended device based on the target content in the chat message 1301, and present the recommended device to the user. Alternatively, when the contact in the chat app is a group, the chat app may also obtain a last chat message that is in the group and that includes the target content, and dynamically recommend, based on the chat message, a corresponding recommended device to the user to open the target content. This is not limited in this embodiment of this application.

In addition, if the last chat message that includes the target content and that is obtained by the chat app exceeds a preset time range, for example, the preset time range is 24 hours, and a last chat message that includes the target content and that is on the chat interface 601 is sent by the contact Sara 24 hours ago, the chat app may no longer recommend a corresponding recommended device to the user, that is, cancel a current device recommendation process, to avoid disturbance caused by the device recommendation process to a chat process in which the user normally uses the chat app.

In some other embodiments, an example in which the user chats with the contact Sara by using the chat app is still used. The chat app may further obtain a chat message sent by the contact Sara within a specific time period. For example, the chat app may obtain N chat messages sent by the contact Sara within last 24 hours. The N chat messages may be displayed on a current chat interface, or may not be displayed on a current chat interface. Further, the chat app may determine, based on the target content included in the N chat messages, one or more recommended devices recommended to the user this time.

Figure 14:
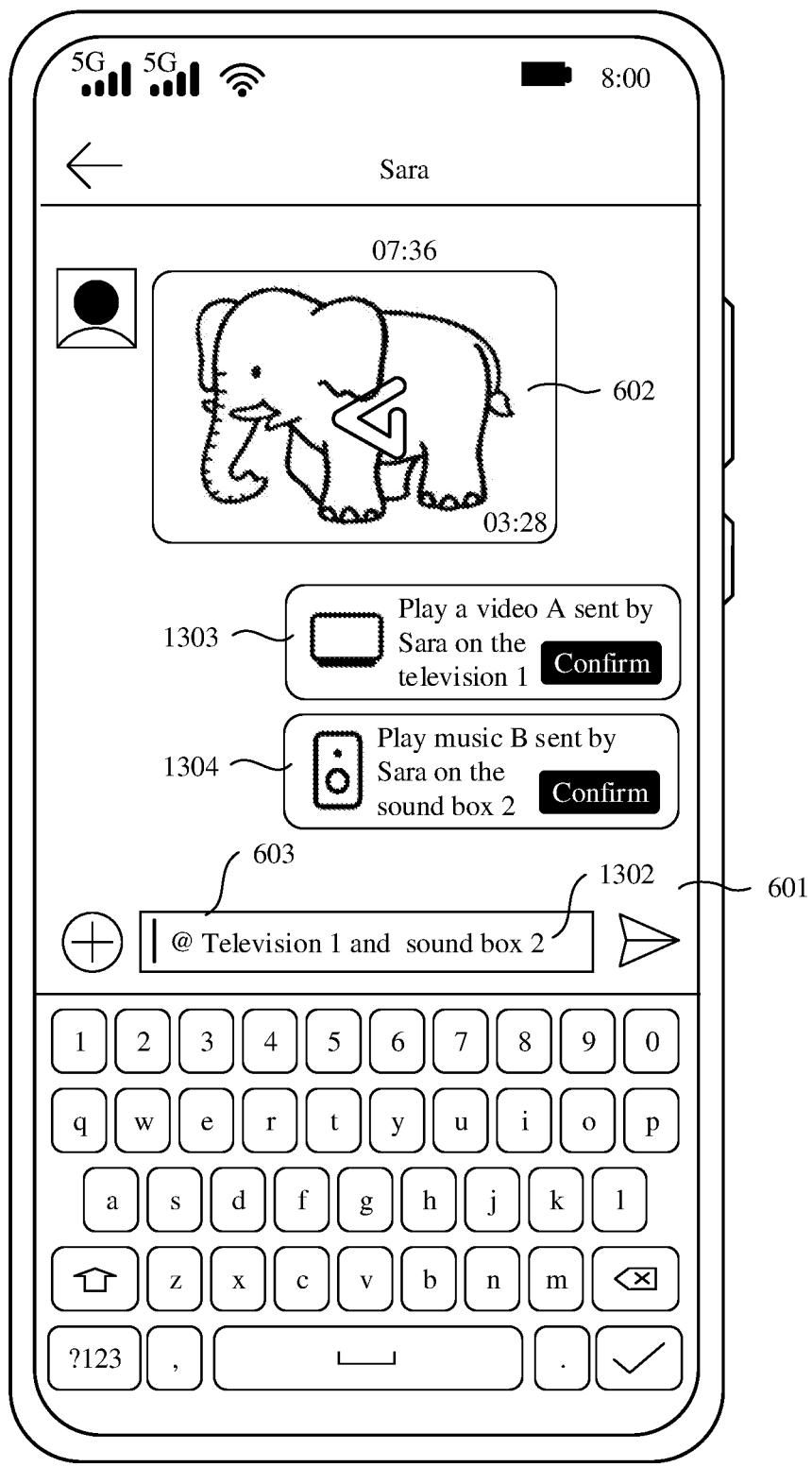
FIG. 14 is a schematic diagram 9 of an application scenario of a device recommendation method according to an embodiment of this application.

For example, in the N chat messages sent by the contact Sara within the last 24 hours, a first chat message includes the video A (the first chat message is displayed on the chat interface 601), and a second chat message includes music B (the second chat message is not displayed on the chat interface 601). In this case, as shown in FIG. 14, if the chat app determines that a recommended device corresponding to the video A in the first chat message is the television 1, and a recommended device corresponding to the music B in the second chat message is the sound box 2, the chat app may automatically input first prompt information 1302 in the input box 603, where the first prompt information 1302 includes the television 1 and the sound box 2. Subsequently, if it is detected that the input box 603 obtains an input focus, still as shown in FIG. 14, the chat app may display two pieces of second prompt information, that is, second prompt information 1303 and second prompt information 1304. The second prompt information 1303 is used to prompt the user to play the video A on the television 1, and the second prompt information 1304 is used to prompt the user to play the music B by using the sound box 2.

In this case, if it is detected that the user inputs an operation of confirming the second prompt information 1303, for example, an operation of tapping the second prompt information 1303 or tapping a confirmation button in the second prompt information 1303, the chat app may trigger the mobile phone to indicate, according to the foregoing method, the television 1 to play the video A. Correspondingly, if it is detected that the user inputs an operation of confirming the second prompt information 1304, for example, an operation of tapping the second prompt information 1304 or tapping a confirmation button in the second prompt information 1304, the chat app may trigger the mobile phone to indicate, according to the foregoing method, the sound box 2 to play the music B.

Certainly, the chat app may alternatively recommend a recommended device to the user based on a last chat message that includes the target content and that is sent by the contact Sara within a recent specific time period. This is not limited in this embodiment of this application.

The foregoing embodiment is described by using an example in which when the user chats with the contact in the chat app, the chat app automatically recommends a corresponding recommended device to the user based on a chat message on the chat interface. In some embodiments, the user may alternatively manually trigger, on the chat interface, the chat app to recommend a corresponding recommended device to the user.

Figure 15:
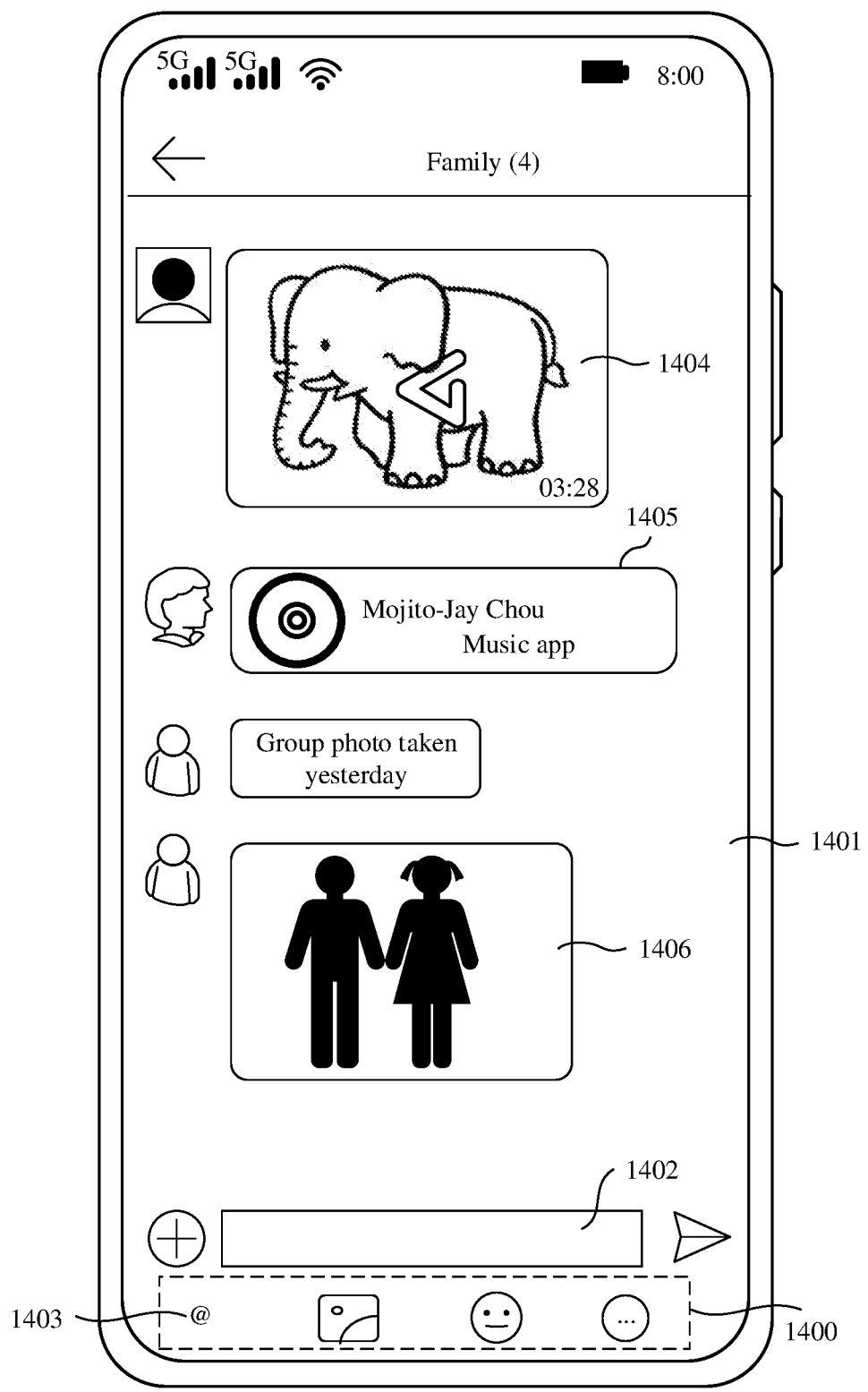
FIG. 15 is a schematic diagram 10 of an application scenario of a device recommendation method according to an embodiment of this application.

For example, FIG. 15 shows a chat interface 1401 with a group "family" in a chat app. A chat interface 1401 includes an input box 1402 and a shortcut menu 1400 that is used to input a chat message. For example, the shortcut menu 1400 may include a preset symbol. For example, the preset symbol is "@". The preset symbol "@" 1403 may be used to establish an association with a contact or an electronic device in a chat message. Certainly, the preset symbol may alternatively be another character. This is not limited in this embodiment of this application. In addition, the shortcut menu 1400 may further include one or more of a picture adding button, an emoticon adding button, or a locating button. In some embodiments, the preset symbol may also be referred to as a reminder symbol. In subsequent embodiments, that the reminder symbol is used as the preset symbol is used as an example for description.

Figure 16:
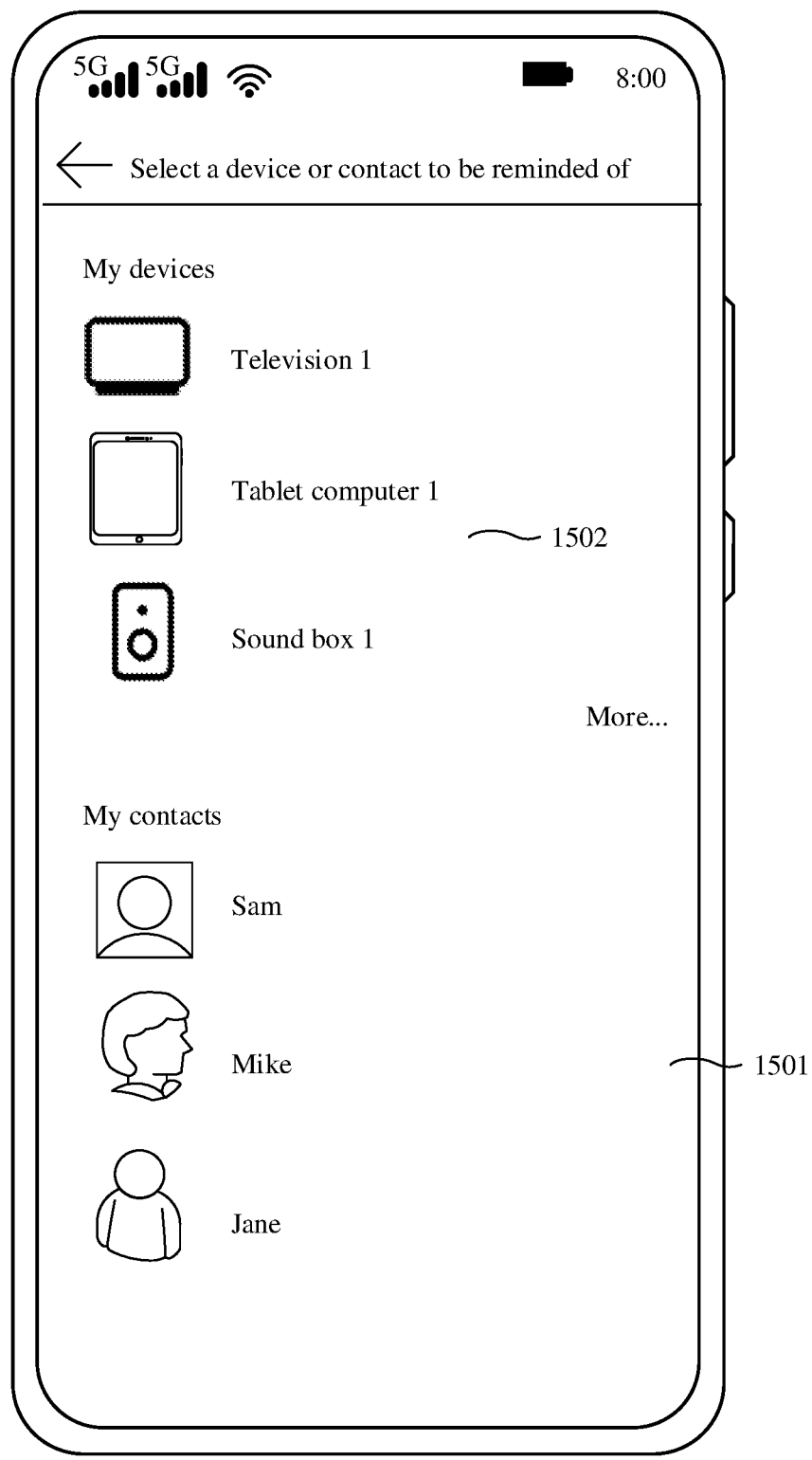
FIG. 16 is a schematic diagram 11 of an application scenario of a device recommendation method according to an embodiment of this application.

If it is detected that a user taps the reminder symbol "@" 1403, the chat app may prompt the user of one or more corresponding recommended devices based on a chat message on the chat interface 1401. For example, after it is detected that the user taps the reminder symbol "@" 1403, the chat app may identify a chat message that is on the chat interface 1401 and that includes the target content. For example, target content in a chat message 1404 is a video, target content in a chat message 1405 is a music card, and target content in a chat message 1406 is a picture. Further, still according to the correspondences shown in Table 1, the chat app may determine, based on the correspondences, recommended devices that are in electronic devices currently logging in to a same account as the mobile phone and that respectively correspond to the foregoing pieces of target content. For example, the electronic devices currently logging in to a same account as the mobile phone include the television 1, the tablet computer 1, the sound box 1, and the printer 1. Recommended devices corresponding to the video include the television 1 and the tablet computer 1, recommended devices corresponding to the music card include the television 1 and the sound box 1, and a recommended device corresponding to the picture includes the television 1. Further, as shown in FIG. 16, the chat app may display the television 1, the tablet computer 1, and the sound box 1 (that is, a set of the foregoing recommended devices) as current recommended devices in a device recommendation list 1502 on a recommendation interface 1501.

For example, the television 1 corresponds to both the video in the chat message 1404 and the music card in the chat message 1405, and further corresponds to the picture in the chat message 1406. This indicates that the television 1 has a highest matching degree with chat messages on the chat interface 1401. In this case, the chat app may use the television 1 as a recommended device with a highest priority, and display the television 1 at a top of the device recommendation list 1502, so that the user can select, from the device recommendation list 1502, a device that needs to be used.

In some embodiments, although the printer 1 that currently logs in to a same account as the mobile phone does not correspond to the target content on the chat interface 1401, the chat app may still display the printer 1 in the device recommendation list 1502. For example, the chat app may display the printer 1 at an end of the device recommendation list 1502. Certainly, a person skilled in the art may further set a display order or a display manner of each recommended device on the recommendation interface 1501 based on actual experience or an actual application scenario. This is not limited in this embodiment of this application. In addition, in addition to the device recommendation list 1502, the recommendation interface 1501 may further include an option such as contacts in the chat app, an official account, or an applet.

In other words, after the user triggers the reminder symbol "@" 1403 on the chat interface 1401, the chat app may determine one or more corresponding recommended devices based on a chat message on the chat interface 1401, and prompt the user of a determined recommended device. In this way, in a process in which the user chats with the contact, when the user expects to use another device to play the target content on the chat interface 1401, the preset reminder symbol "@" 1403 may be used to trigger the chat app to recommend, to the user, a recommended device corresponding to the target content on the current chat interface.

In some embodiments, after the user taps the reminder symbol "@" 1403 on the chat interface 1401, the chat app may obtain chat messages within a preset time period (for example, 24 hours) from a currently stored chat record. The chat messages within the preset time period may be chat messages displayed on the chat interface 1401, or may be chat messages that are not displayed on the chat interface 1401. Further, the chat app may identify, from the chat messages within the preset time period, a chat message including the target content. Subsequently, the chat app may recommend, to the user according to the foregoing method, a recommended device corresponding to the target content. In this way, the chat app recommends a recommended device to the user based on the target content in the chat message within a specific time period, so that timeliness of the recommended device recommended to the user is ensured.

Certainly, the chat app may first obtain the chat messages displayed on the chat interface 1401, select, from the obtained chat messages, a chat message that is within the preset time period and that includes the target content, and then recommend, to the user based on the obtained chat message, a recommended device corresponding to the target content. This is not limited in this embodiment of this application.

Figure 17:
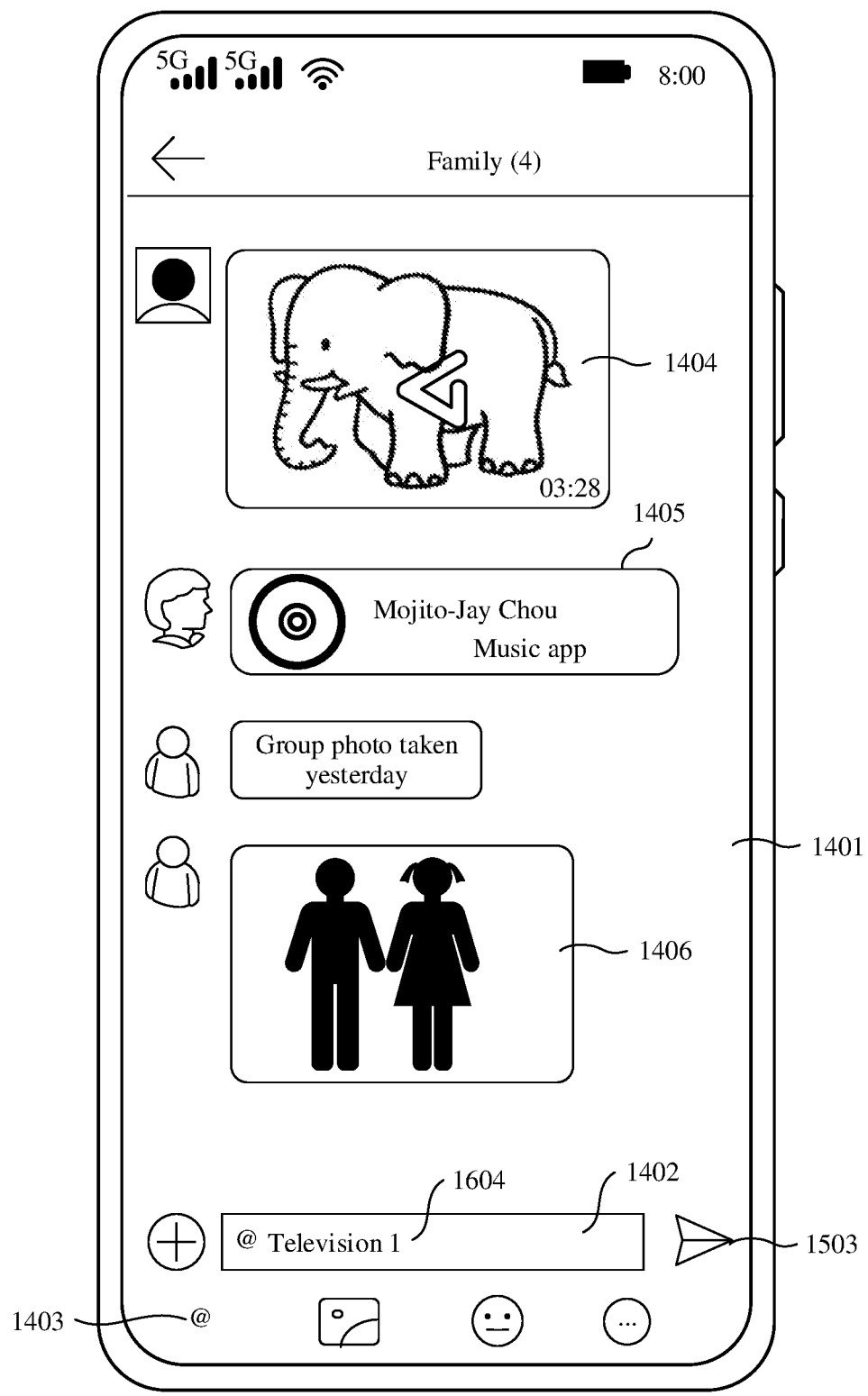
FIG. 17 is a schematic diagram 12 of an application scenario of a device recommendation method according to an embodiment of this application.

Still as shown in FIG. 16, after the chat app displays, on the recommendation interface 1501, the device recommendation list 1502 including current recommended devices, the user may select, from the device recommendation list 1502, a device that needs to be used this time. For example, the user selects the television 1 from the device recommendation list 1502. After it is detected that the user taps the television 1 in the device recommendation list 1502, as shown in FIG. 17, the chat app may jump back to the chat interface 1401 from the recommendation interface 1501. In addition, first prompt information 1604 of "@Television 1" is automatically input in the input box 1402 on the chat interface 1401. If the user confirms to use the television 1 to play the target content in the chat message, that is, confirms the first prompt information 1604, the user may tap a sending button 1503 of a chat message on the chat interface 1401.

Figure 18A:
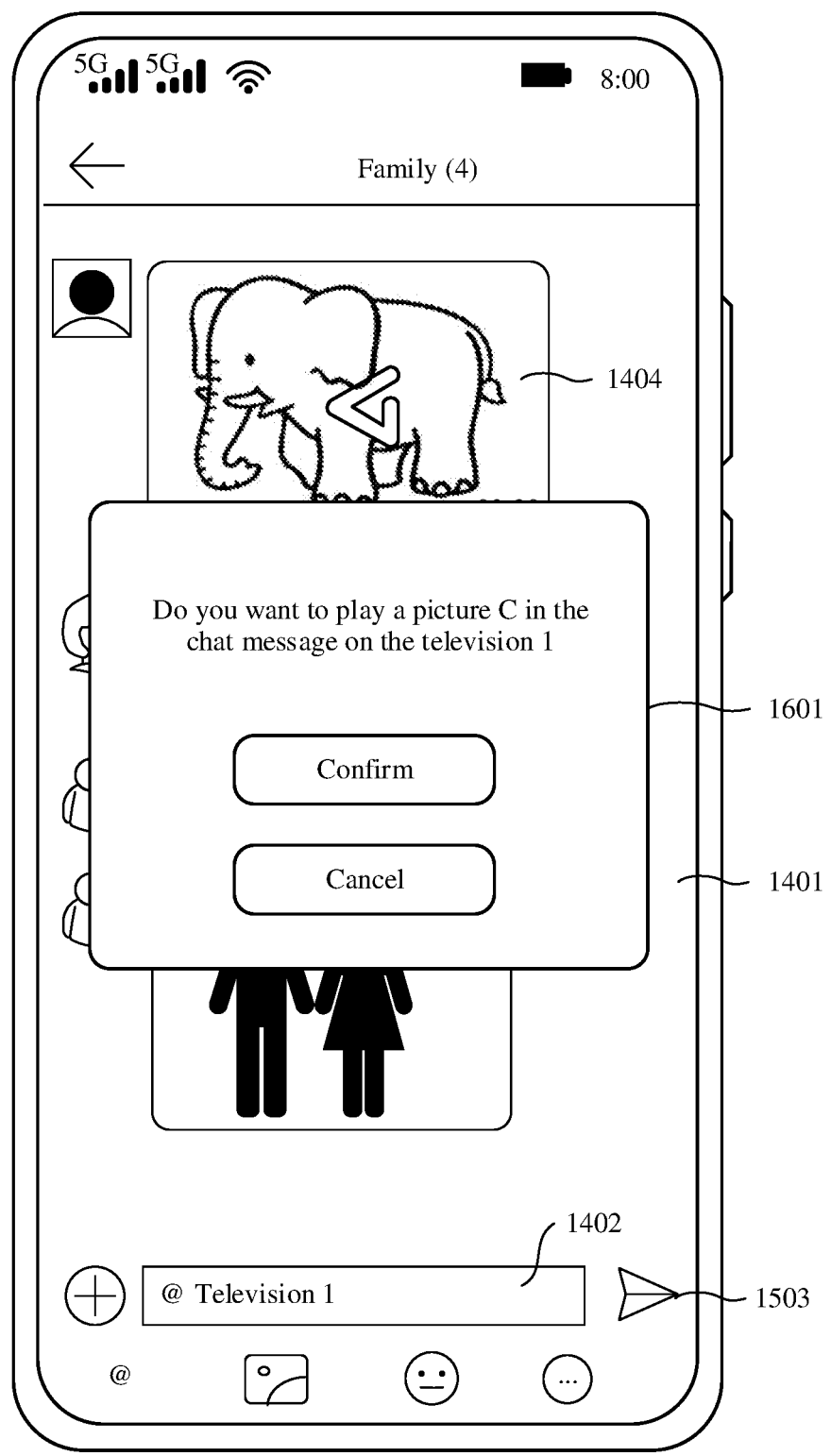
FIG. 18A to FIG. 18C are a schematic diagram 13 of an application scenario of a device recommendation method according to an embodiment of this application.

After the chat app detects that the user taps the sending button 1503 of the chat message, as shown in FIG. 18A, the chat app may display a dialog box 1601. In the dialog box 1601, the chat app may prompt the user whether to determine to play a picture C on the television 1, that is, the target content in the last chat message 1406 that includes the target content. If it is detected that the user taps a confirmation button in the dialog box 1601, the mobile phone may indicate the television 1 to play the picture C. For example, the mobile phone may send the picture C in the chat message 1406 to the television 1, and the television 1 displays the picture C. For another example, the mobile phone may send the picture C in the chat message 1406 to the server, and the server sends the picture C in the chat message 1406 to the television 1, so that the television 1 may display the received picture C.

Figure 18B:
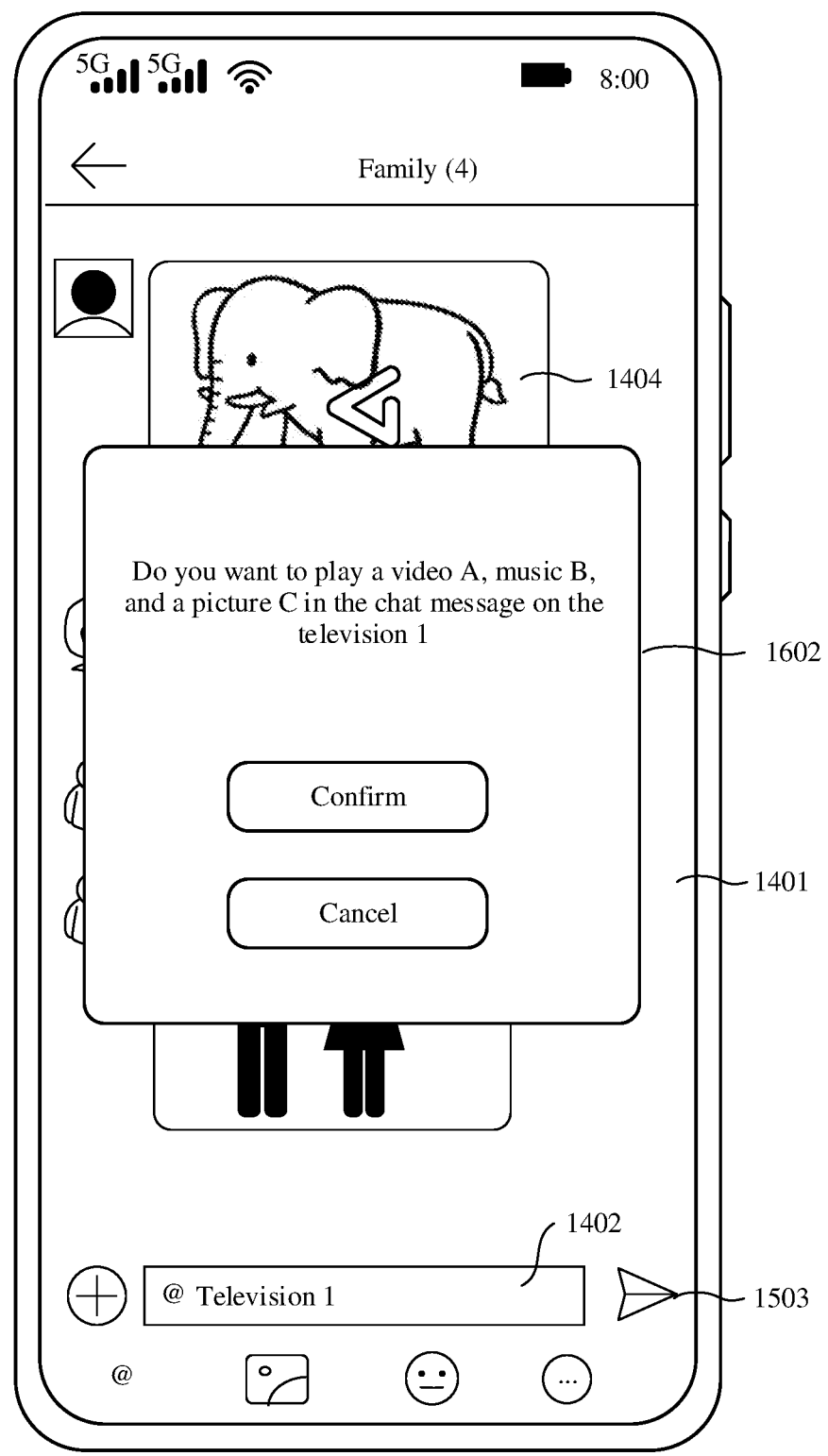

Alternatively, after the chat app detects that the user taps the sending button of the chat message, because the television 1 may play both the video in the chat message 1404 and the music card in the chat message 1405, and may further play the picture in the chat message 1406, as shown in FIG. 18B, the chat app may display a dialog box 1602. In the dialog box 1602, the chat app may prompt the user whether to determine to play the video A (that is, the video in the chat message 1404), the music B (that is, the music card in the chat message 1405), and the picture C (that is, the picture in the chat message 1406) on the television 1. If it is detected that the user taps a confirmation button in the dialog box 1602, the mobile phone may indicate the television 1 to play the video A, the music B, and the picture C.

Figure 18C:
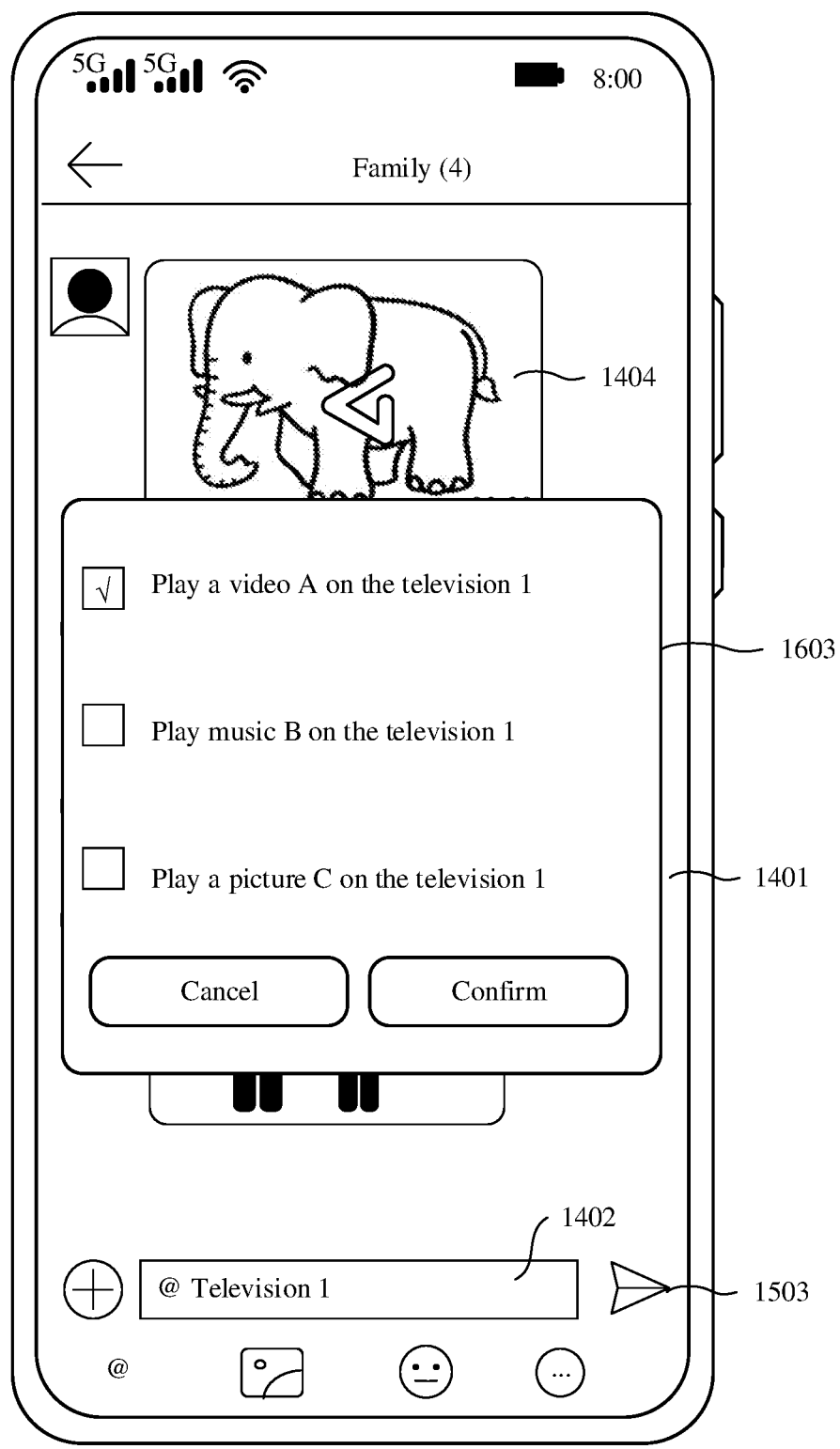

Alternatively, as shown in FIG. 18C, after the chat app detects that the user taps the sending button of the chat message, the chat app may separately display, in the dialog box 1603, three options of playing the video A on the television 1, playing the music B on the television 1, and playing the picture C on the television 1. In this way, the user may select, from the dialog box 1603, specific content that needs to be played on the television 1.

In another possible implementation, if the user confirms to use the television 1 to play the target content in the chat message, the user may alternatively tap the input box 1402, so that the input box obtains an input focus. In this case, the chat app may also determine that the user confirms the first prompt information 1604. Similar to the device recommendation method in the foregoing embodiment, the chat app may continue to display, on the chat interface 1401, second prompt information that is similar to the second prompt information 801 shown in FIG. 8. In this case, the displayed second prompt information may be used to prompt the user to play one or more pieces of target content on the chat interface 1401 by using the television 1. This is not limited in this embodiment of this application.

It may be understood that, if a device selected by the user from the device recommendation list 1502 is a printer, the chat app may prompt, in a corresponding dialog box or prompt information, the user whether to print a photo or a document in a related chat message. In other words, the chat app may perform a corresponding operation on the target content in the chat message based on a function of a recommended device. This is not limited in this embodiment of this application.

Figure 19:
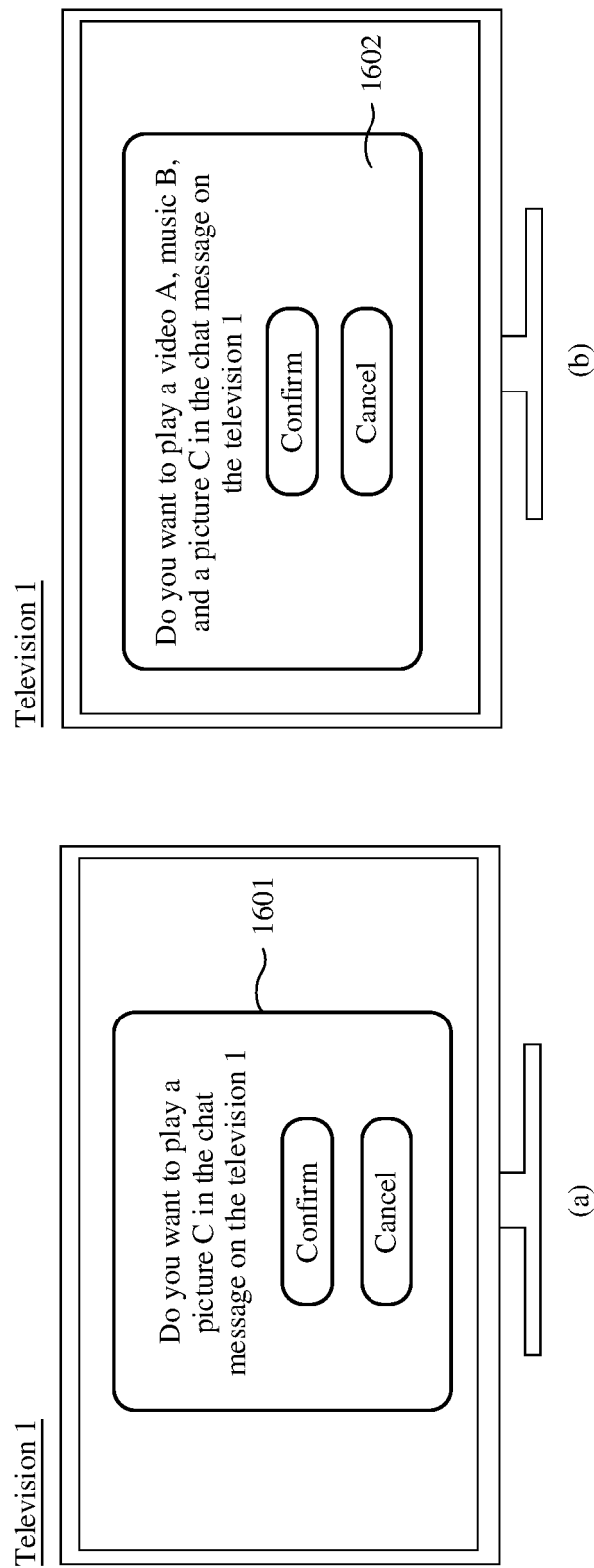
FIG. 19 is a schematic diagram 14 of an application scenario of a device recommendation method according to an embodiment of this application.

In some other embodiments, after the chat app detects that the user taps the sending button of the chat message, the mobile phone may also indicate the television 1 to display the foregoing dialog box. For example, as shown in (a) in FIG. 19, the television 1 may display the dialog box 1601, to prompt the user whether to determine to play the picture C (that is, the picture in the chat message 1406) on the television 1. For another example, as shown in (b) in FIG. 19, the television 1 may display the dialog box 1602, to prompt the user whether to determine to play the video A (that is, the video in the chat message 1404), the music B (that is, the music card in the chat message 1405), and the picture C (that is, the picture in the chat message 1406) on the television 1. If the television 1 receives an operation of selecting a confirmation button in the dialog box 1601 (or the dialog box 1602) by the user, the television 1 may start to play target content in a chat message received from the mobile phone or the server. In this way, a case in which the user triggers, due to a misoperation on the chat app in the mobile phone, the television 1 to play the target content in the chat message can be avoided.

Figure 20:
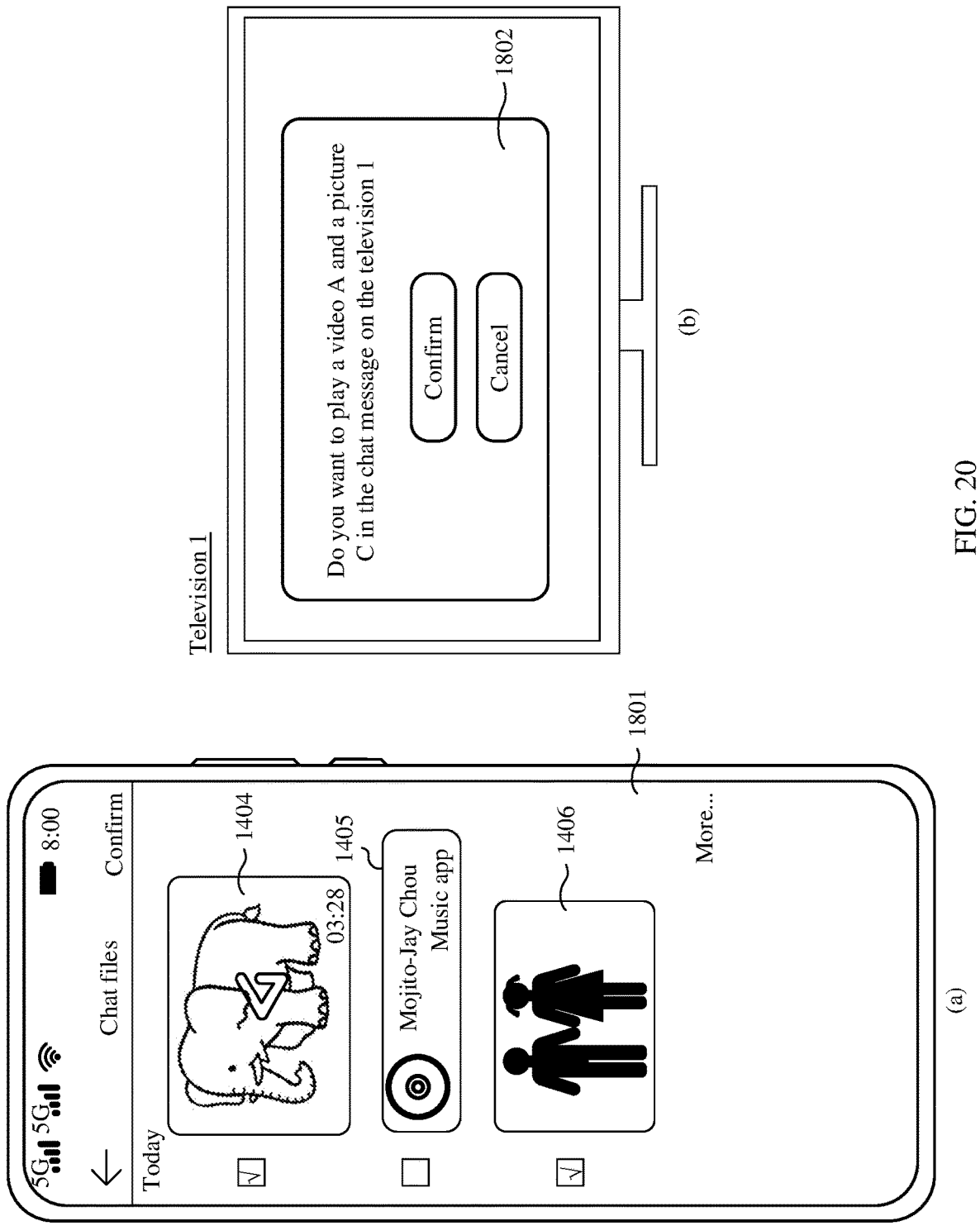
FIG. 20 is a schematic diagram 15 of an application scenario of a device recommendation method according to an embodiment of this application.

In some other embodiments, after the chat app displays the device recommendation list 1502 on the recommendation interface 1501, if it is detected that the user selects a device, for example, the television 1, from the device recommendation list 1502, as shown in (a) in FIG. 20, the chat app may further jump to a selection interface 1801. The chat app may display, on the selection interface 1801, one or more pieces of target content included in identified chat messages as candidate items, and the user may select, on the selection interface 1801, specific target content that is to be opened on the television 1. For example, if it is detected that the user selects two candidate items: the video A and the picture C on the selection interface 1801, the chat app may trigger the mobile phone to send the video A and the picture C to the television 1. In addition, as shown in (b) in FIG. 20, before playing the video A and the picture C, the television 1 may further display a prompt box 1802, and prompt, in the prompt box 1802, the user whether to determine to play the video A and the picture C on the television 1. When the television 1 receives an operation of selecting a confirmation button in the prompt box 1802 by the user, the television 1 may start to play the video A and the picture C.

It should be noted that, after the user selects the television 1 from the device recommendation list 1502, the television 1 may not support playing of target content in all chat messages. For example, the television 1 may not play target content of a document type. In this case, the chat app may not display, on the selection interface 1801, the target content of the document type in the chat messages. In other words, the chat app may display, on the selection interface 1801, only the target content in the chat messages that can be played by the television 1. Alternatively, the chat app may display, on the selection interface 1801, the target content of the document type in the chat messages. However, the target content cannot be selected. In other words, the target content is not selectable for the user.

In addition, after the chat app jumps to the selection interface 1801, the user may further trigger, by scrolling the selection interface 1801, the chat app to display target content in more chat messages. In this way, the user may further select more target content from the chat app to play on the television 1.

In the foregoing embodiment, an example in which the user inputs the preset reminder symbol "@" on the chat interface to trigger the chat app to recommend a corresponding recommended device to the user is used for description. It may be understood that a person skilled in the art may further design another interaction manner to trigger the chat app to recommend, to the user, a recommended device corresponding to the target content in the chat message.

Figure 21A:
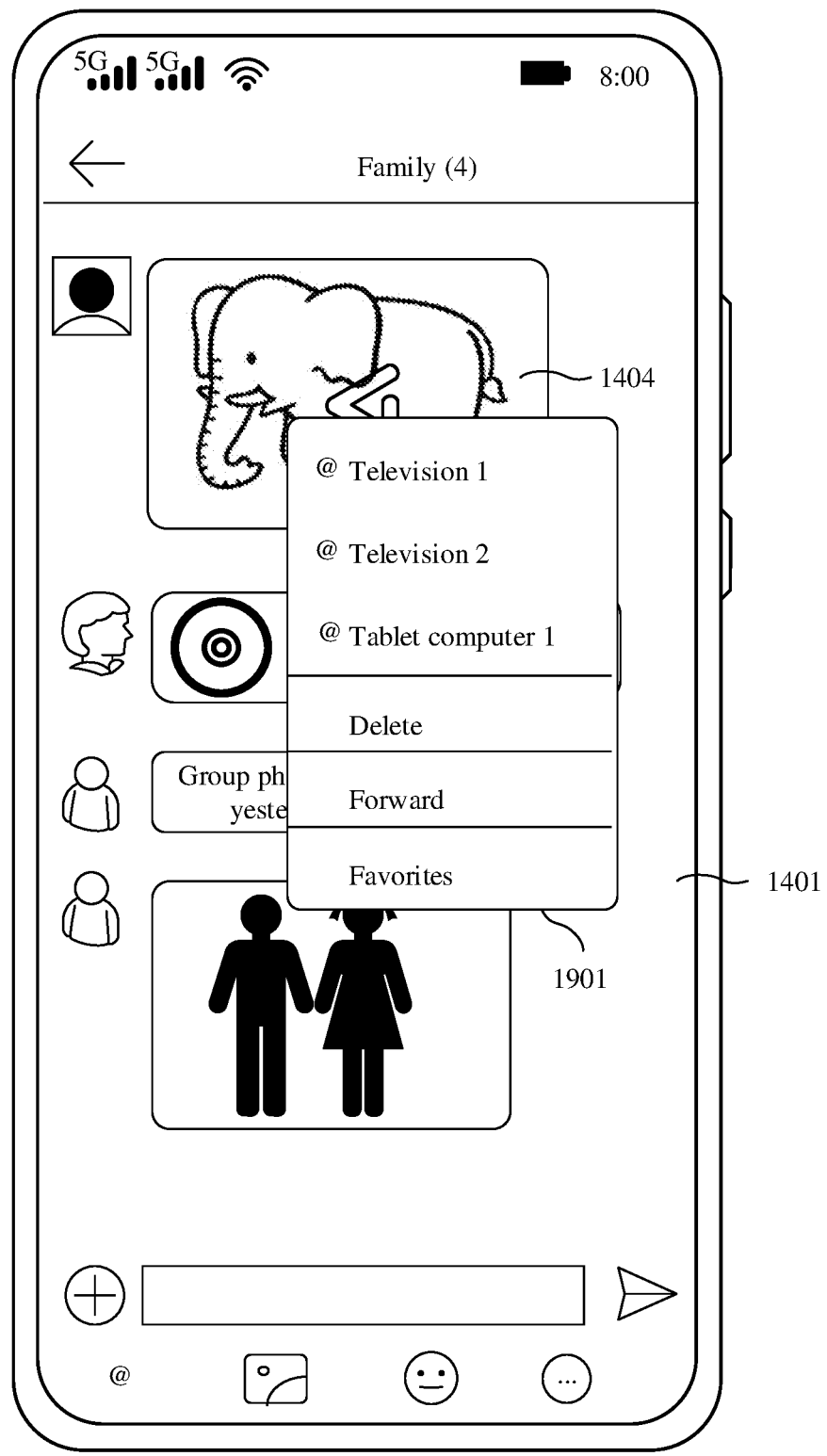
FIG. 21A and FIG. 21B are a schematic diagram 16 of an application scenario of a device recommendation method according to an embodiment of this application.

For example, the chat interface 1401 with the group "family" in the chat app is still used as an example. As shown in FIG. 21A, if it is detected that the user inputs a preset operation (for example, a touch and hold operation) on the chat message 1404, the chat app may search for recommended devices corresponding to the video A in the chat message 1404 from devices that currently log in to a same account as the mobile phone. The recommended devices include the television 1, a television 2, and the tablet computer 1. Further, still as shown in FIG. 21A, the chat app may display the television 1, the television 2, and the tablet computer 1 as three options in a touch and hold menu 1901. Certainly, options such as Favorites, Forward, and Delete may be further set in the touch and hold menu 1901. This is not limited in this embodiment of this application. In other words, the user may trigger, by inputting a preset operation in a chat message, the chat app to recommend a recommended device corresponding to target content in the chat message to the user.

In the foregoing embodiment, the chat app directly displays the found television 1, television 2, and tablet computer 1 as three options in the touch and hold menu 1901. In some other embodiments, the chat app may alternatively set, in the touch and hold menu 1901, an option used to query a recommended device. For example, an option of "recommended device" is displayed in the touch and hold menu 1901. If it is detected that the user selects the option of "recommended device", the chat app may display a level-2 menu of the touch and hold menu 1901, and display, in the level-2 menu, the television 1, the television 2, and the tablet computer 1 that are found by the chat app. The user may select, from the level-2 menu, a specific device that is used to open the video A in the chat message 1404.

Figure 21B:
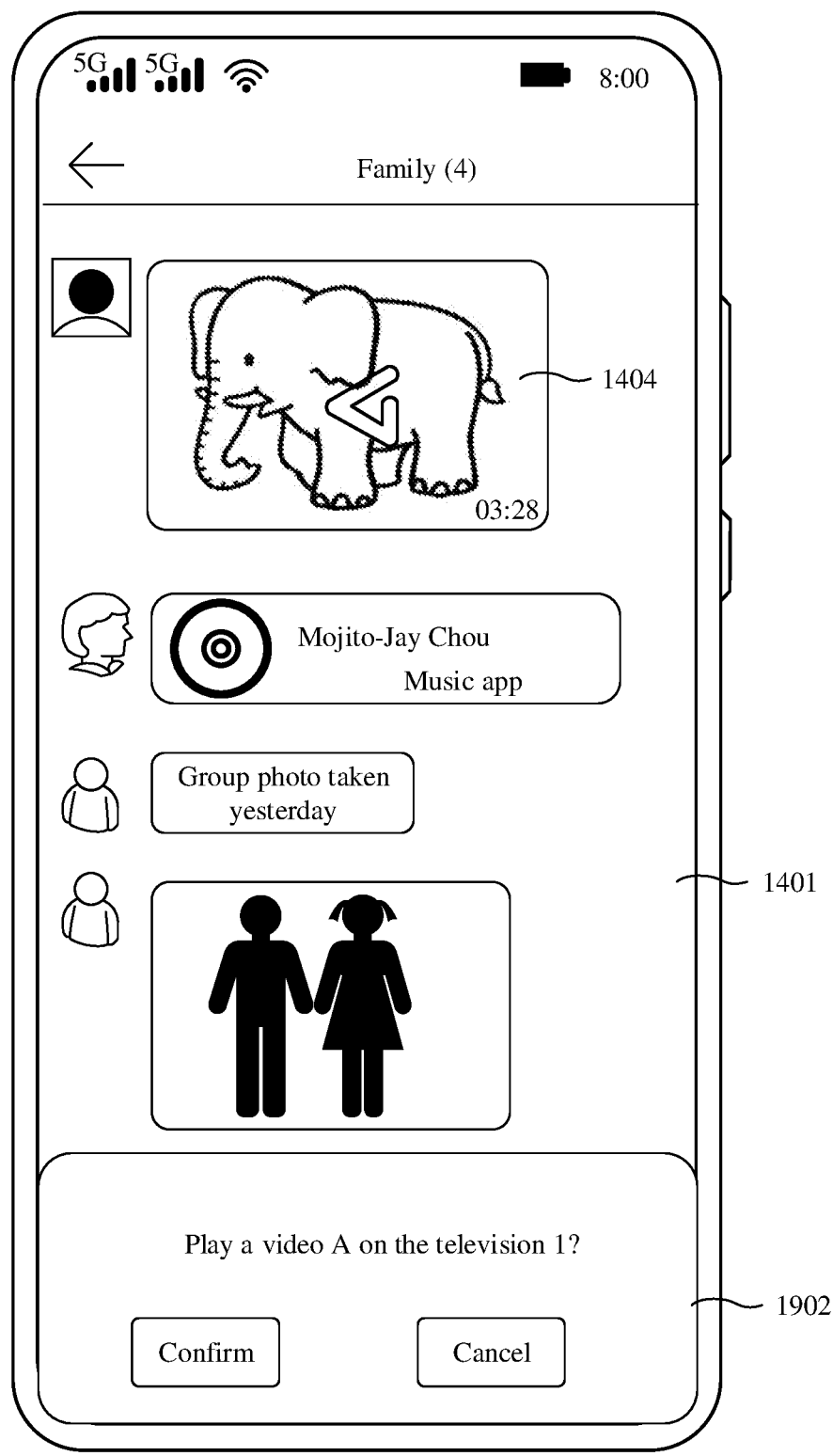

Subsequently, if it is detected that the user selects a device, for example, the television 1, from the touch and hold menu 1901, as shown in FIG. 21B, the chat app may display a dialog box 1902, and prompt, in the dialog box 1902, the user whether to confirm to play the video A on the television 1. If it is detected that the user selects a confirmation button in the dialog box 1902, the chat app may trigger the mobile phone to send the video A to the television 1. For example, the mobile phone may send the video A to the television 1 by using the server, and the television 1 plays the video A.

Figure 22A:
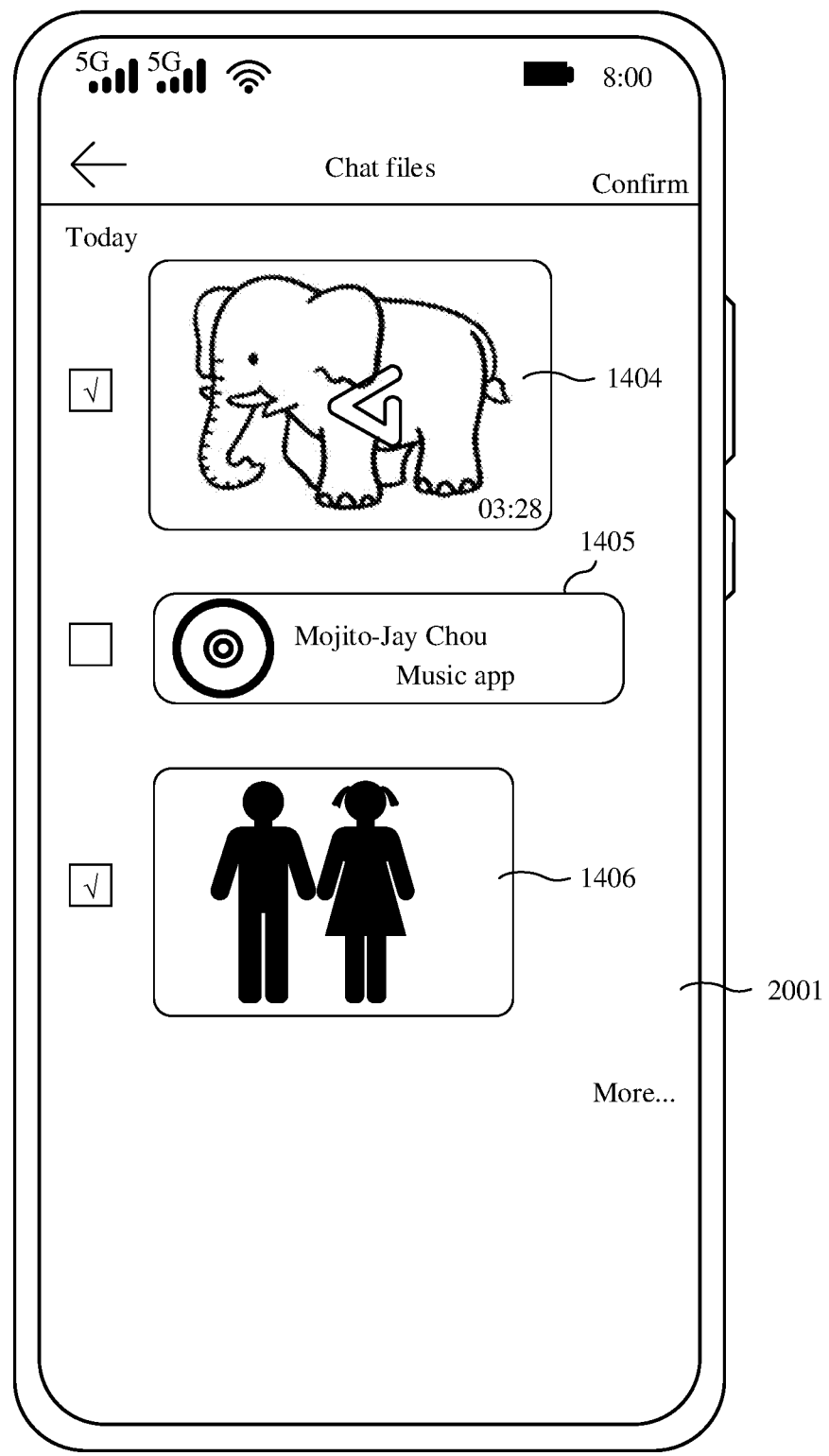
FIG. 22A and FIG. 22B are a schematic diagram 17 of an application scenario of a device recommendation method according to an embodiment of this application.
Figure 22B:
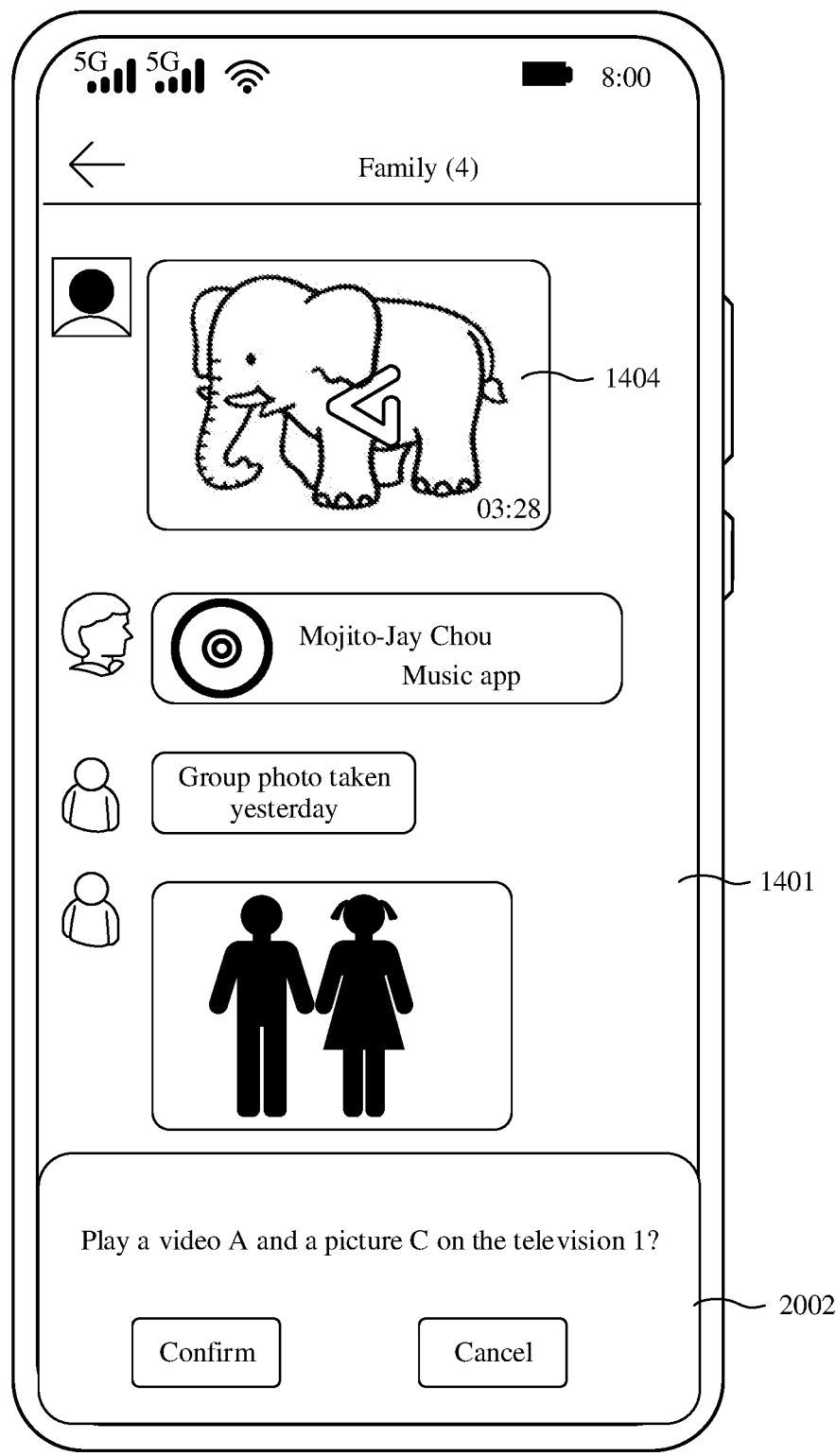

Alternatively, if it is detected that the user selects a device, for example, the television 1, from the touch and hold menu 1901, as shown in FIG. 22A, the chat app may jump to a selection interface 2001. The selection interface 2001 includes one or more pieces of target content included in chat messages that are identified by the chat app. The user may select, on the selection interface 2001, specific target content that is to be opened on the television 1. For example, if it is detected that the user selects the video A and the picture C on the selection interface 2001, as shown in FIG. 22B, the chat app may display a dialog box 2002, and prompt, in the dialog box 2002, the user whether to confirm to play the video A and the picture C on the television 1. If it is detected that the user selects a confirmation button in the dialog box 2002, the chat app may trigger the mobile phone to send the video A and the picture C to the television 1, and the television 1 plays the video A and the picture C.

In the foregoing embodiment, an example in which the chat app recommends, to the user based on target content such as a video, a picture, or a card in the chat message, a related recommended device for opening the target content is used for description. In some embodiments of this application, the chat app may further recommend related service content to the user based on text information in a chat message.

Figure 23A:
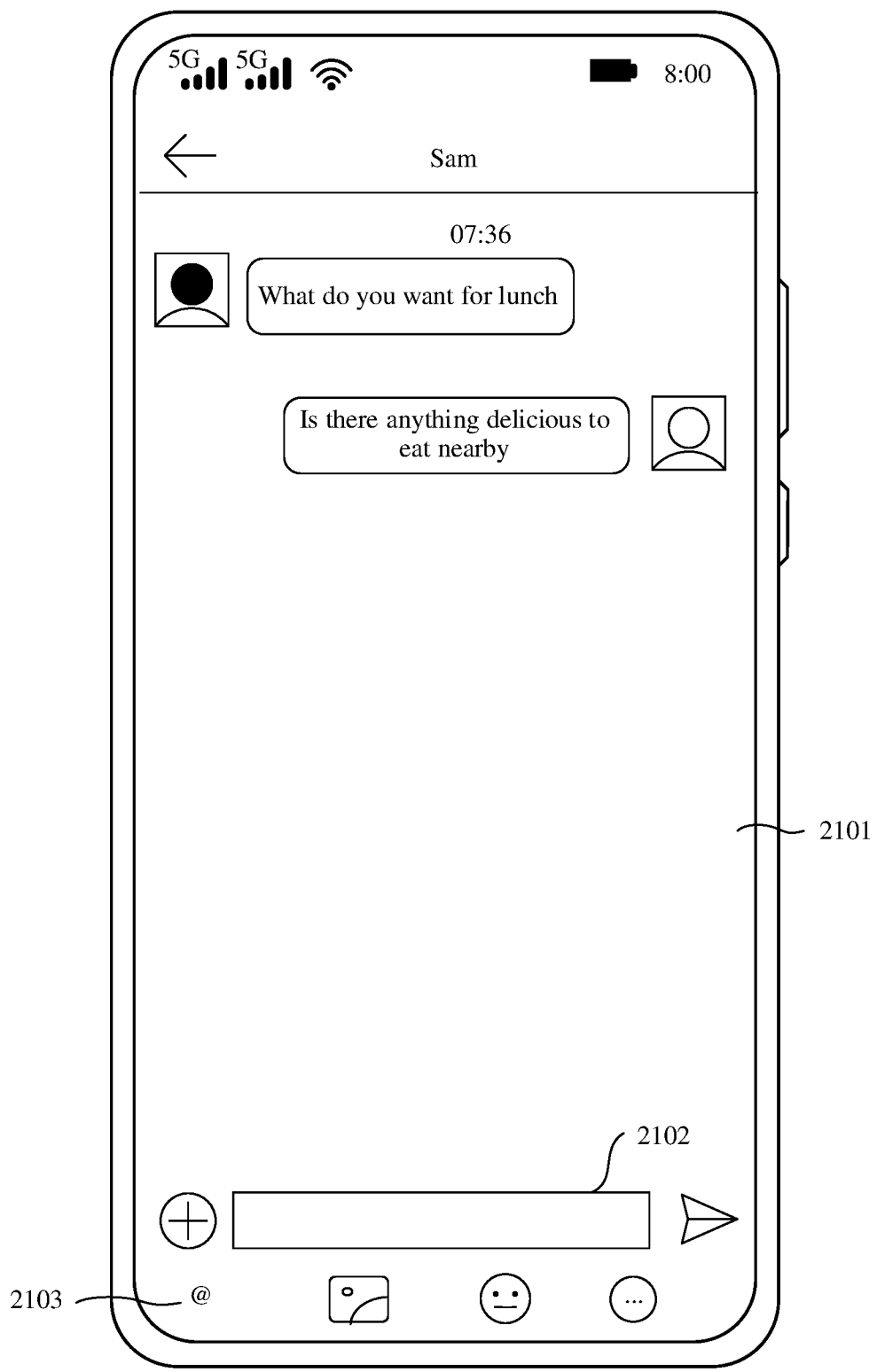
FIG. 23A and FIG. 23B are a schematic diagram 18 of an application scenario of a device recommendation method according to an embodiment of this application.
Figure 23B:
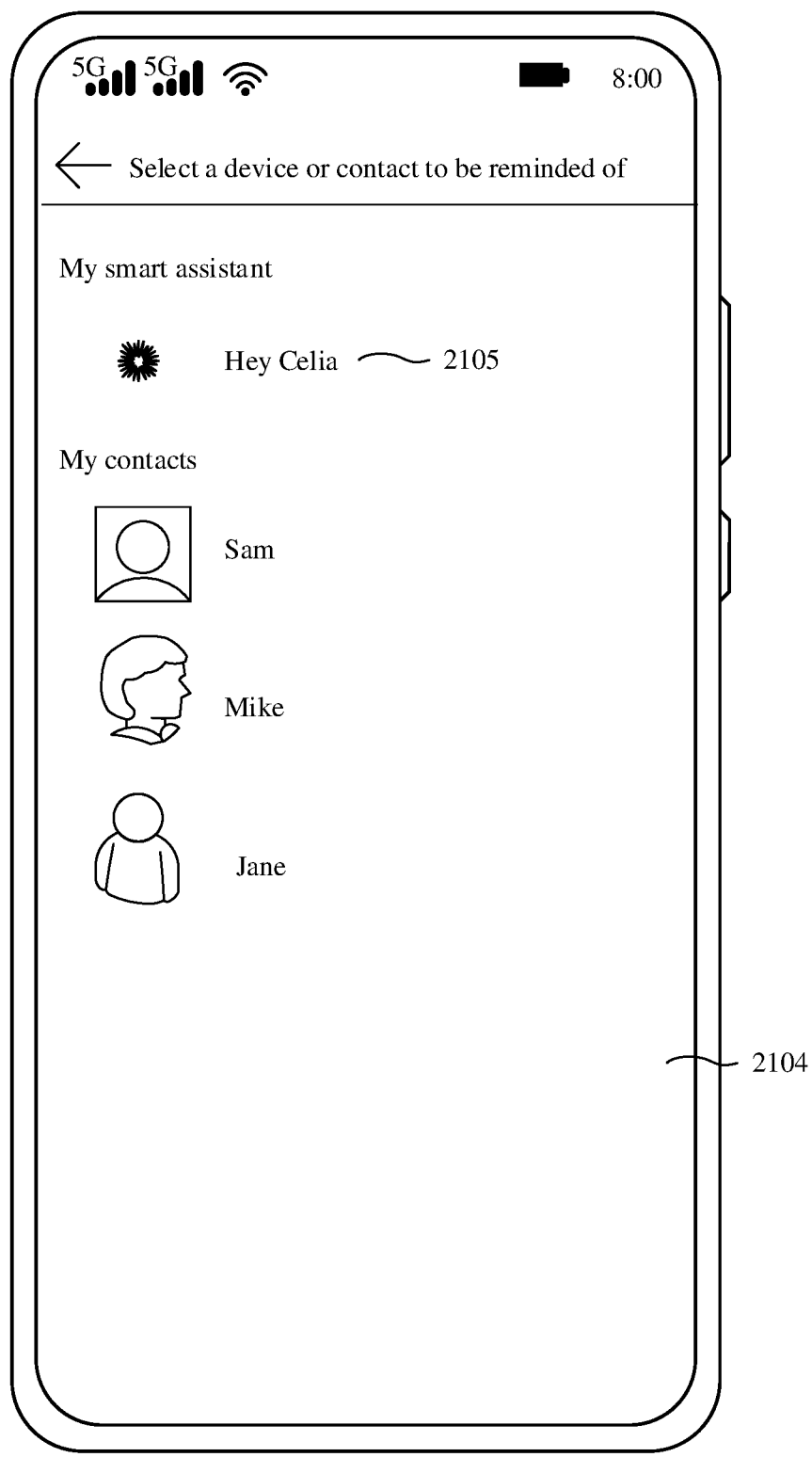

For example, FIG. 23A shows a chat interface 2101 with a contact Sam in the chat app. The chat interface 2101 includes an input box 2102 and a preset reminder symbol "@" 2103. If it is detected that the user taps the reminder symbol "@" 2103, as shown in FIG. 23B, the chat app may jump to a reminder interface 2104. The reminder interface 2104 may include an intelligent assistant (which may also be referred to as a voice assistant), for example, intelligent assistant "Hey Celia" 2105, provided by the mobile phone or the chat app. Certainly, the reminder interface 2104 may further include an option such as contacts in the chat app, an official account, or an applet.

Figure 24A:
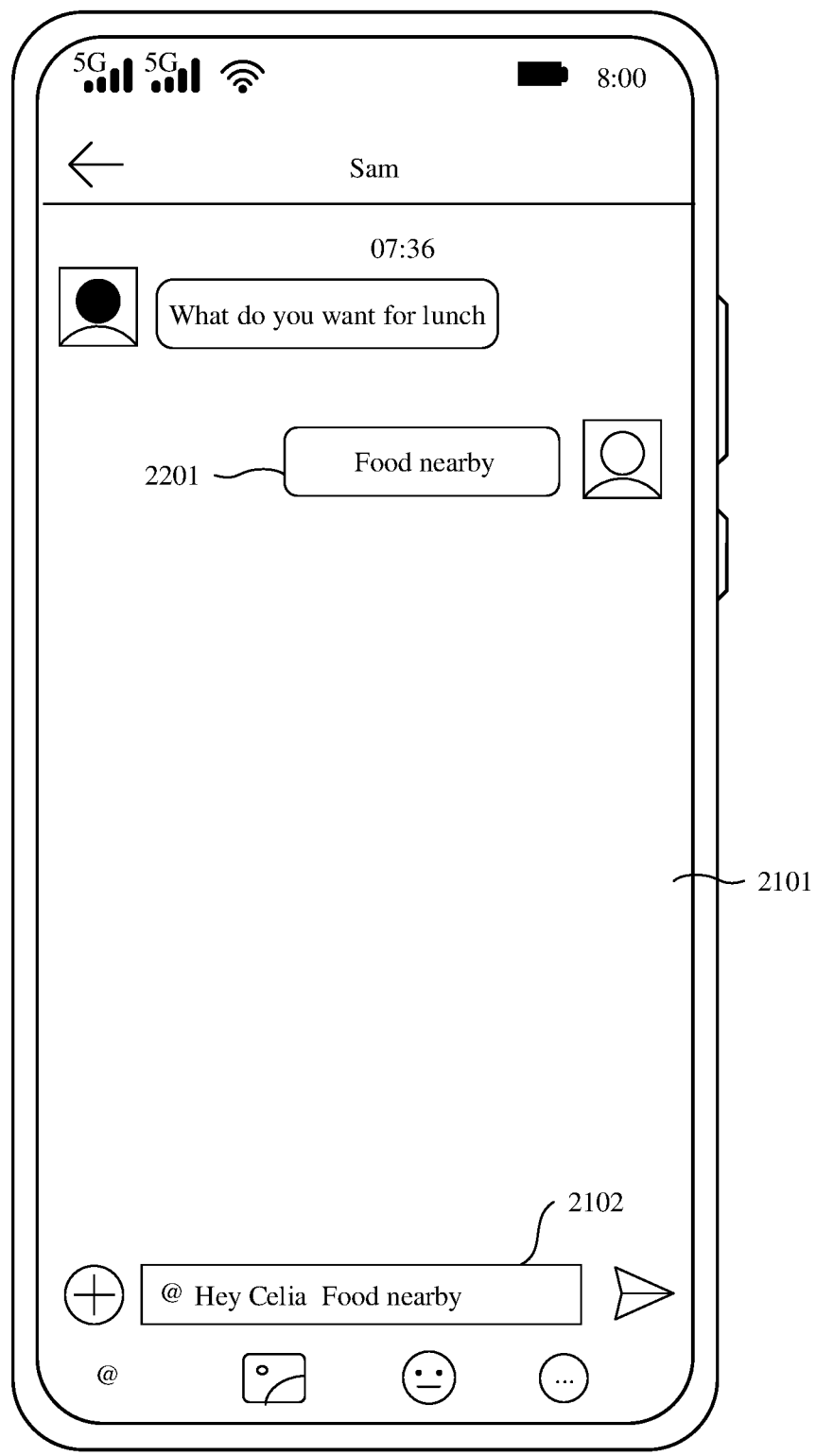
FIG. 24A to FIG. 24C are a schematic diagram 19 of an application scenario of a device recommendation method according to an embodiment of this application.

If it is detected that the user selects the intelligent assistant "Hey Celia" 2105 on the reminder interface 2104, it indicates that the user needs to interact with the intelligent assistant "Hey Celia" 2105. In this case, as shown in FIG. 24A, the chat app may jump back to the chat interface 2101, and extract a last chat message 2201 that includes a text and that is on the chat interface 2101. In this case, the chat app may automatically input "@Hey Celia+text content in the chat message 2201" in the input box 2102. If it is detected that the user taps a sending button of the chat message, the chat app may invoke an application service of the intelligent assistant "Hey Celia", and input the text content in the chat message 2201 in the application service of "Hey Celia", so that the intelligent assistant "Hey Celia" can query related service content based on the text content in the chat message 2201.

Figure 24B:
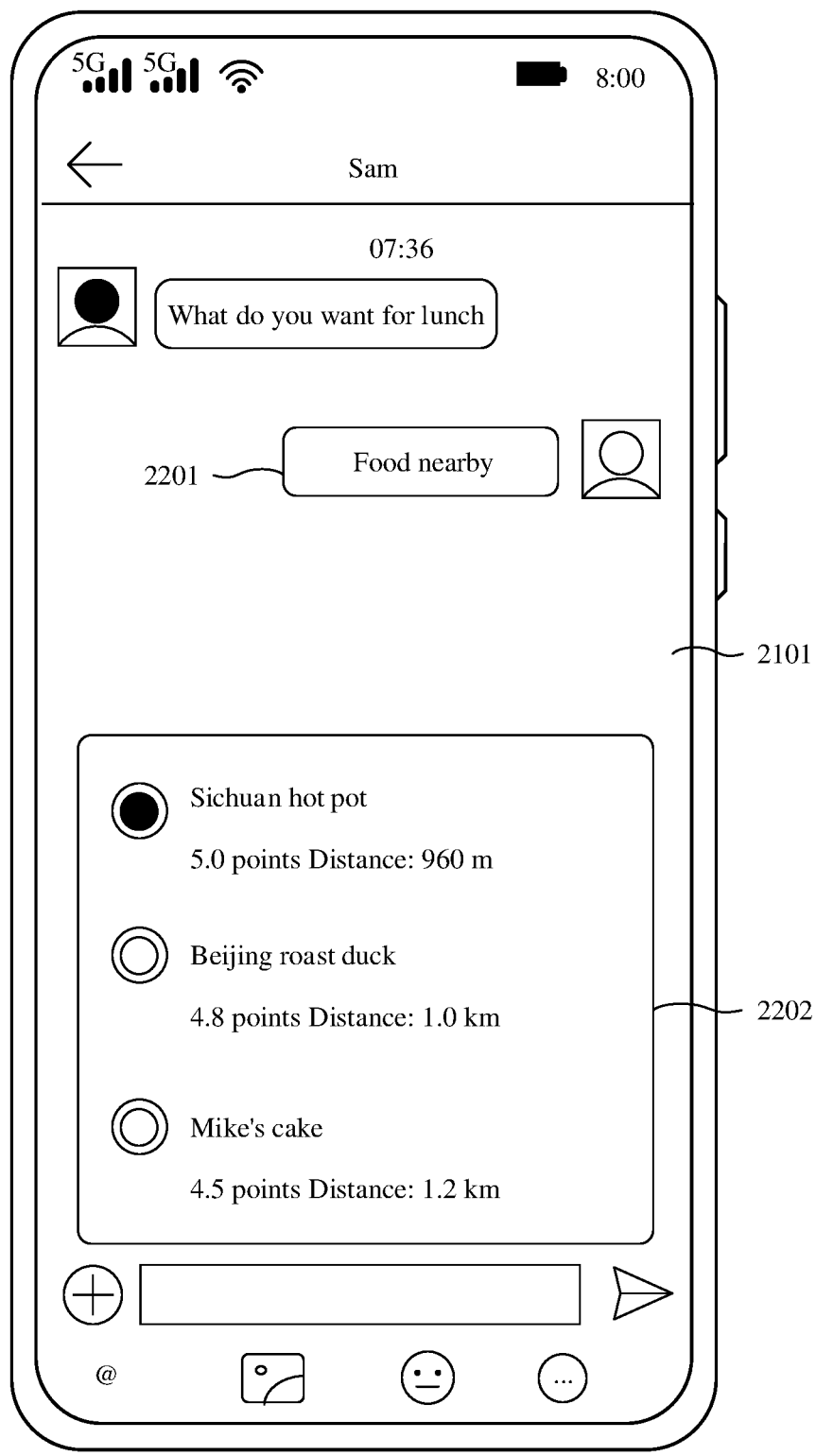

For example, if the text content in the chat message 2201 is "food nearby", the intelligent assistant "Hey Celia" may search for food nearby based on the text content. Subsequently, as shown in FIG. 24B, the intelligent assistant "Hey Celia" may send found service content to the chat app, and the chat app may display one or more pieces of service content found by the intelligent assistant "Hey Celia" to the user by using a card 2202 (or in a form of a floating window or the like).

Figure 24C:
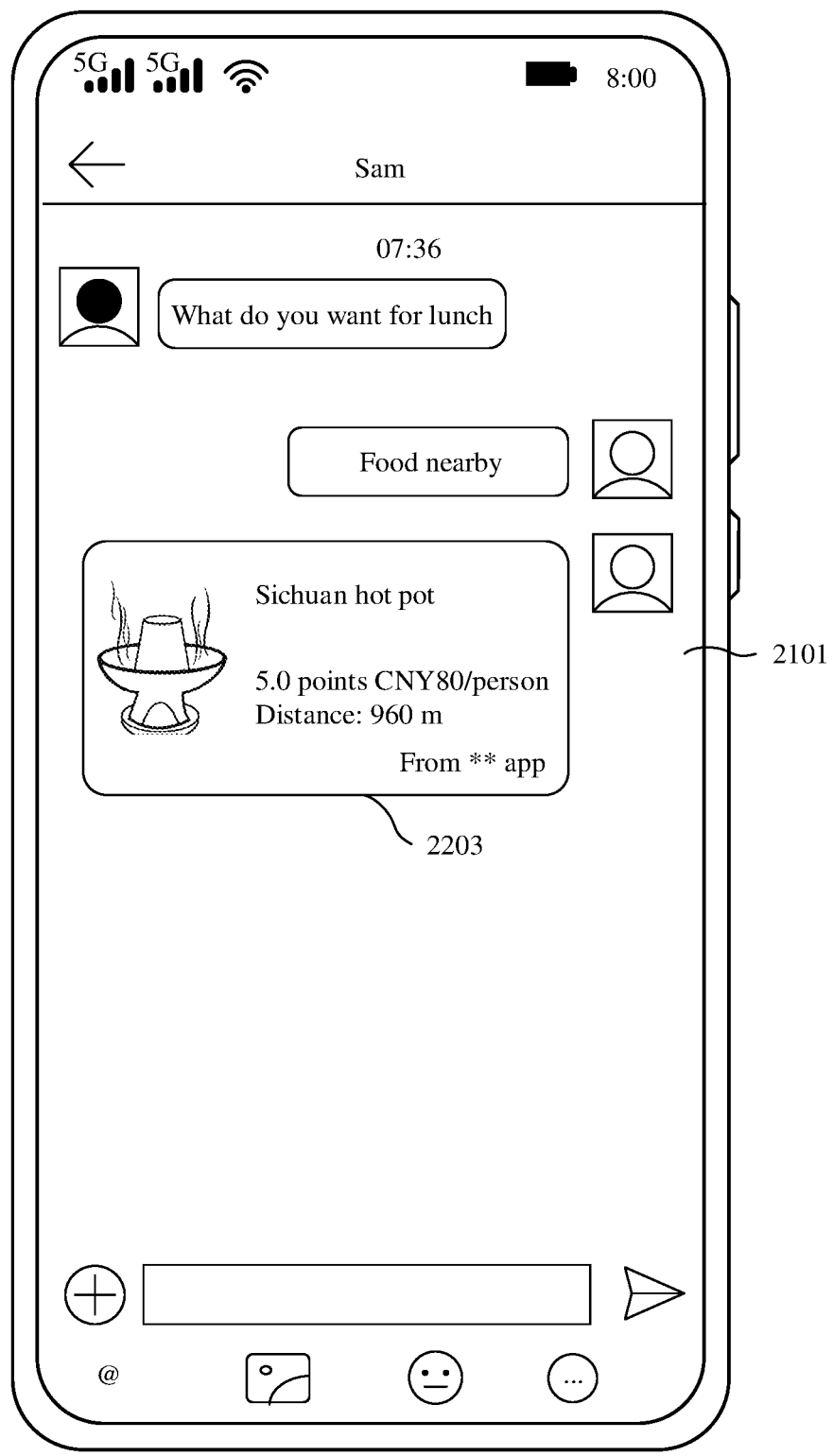

Subsequently, the user may select, from the card 2202, specific service content that needs to be sent to a contact. For example, if it is detected that the user selects first service content 2203 from the card 2202, as shown in FIG. 24C, the chat app may share the first service content 2203 to the chat interface 2101 in a form of a chat message. For example, the chat app may obtain information such as a link, a text, and a thumbnail that are of the first service content 2203 from the server, assemble the information into a card, and then display the card on the chat interface 2101. Similarly, the chat app may send the information such as the link, the text, and the thumbnail that are of the first service content 2203 to a mobile phone of the contact Sam by using the server. The mobile phone of the contact Sam assembles the received information into a card and then displays the card on a corresponding chat interface.

In this way, the user may trigger, by "@" the intelligent assistant "Hey Celia" on the chat interface, the intelligent assistant "Hey Celia" to provide corresponding service content to the user based on the text information in the chat message, so that the user selects one or more pieces of service content to share with a contact on the chat interface.

In addition, a process of interaction between the user and the intelligent assistant "Hey Celia" is invisible to the contact on the chat interface. For example, the service content in the card 2202 provided by the intelligent assistant "Hey Celia" for the user is not displayed on a chat interface of the contact Sam. In this way, when chatting with the contact in the chat app, the user may further interact with the intelligent assistant "Hey Celia", and in an interaction process, the mobile phone does not need to switch an application or jump to a page, so that the user can chat with a current contact in the chat app while interacting with the intelligent assistant "Hey Celia". In addition, a result of the interaction with the intelligent assistant "Hey Celia" is shared with the contact, to improve chat experience of the user.

Figure 25A:
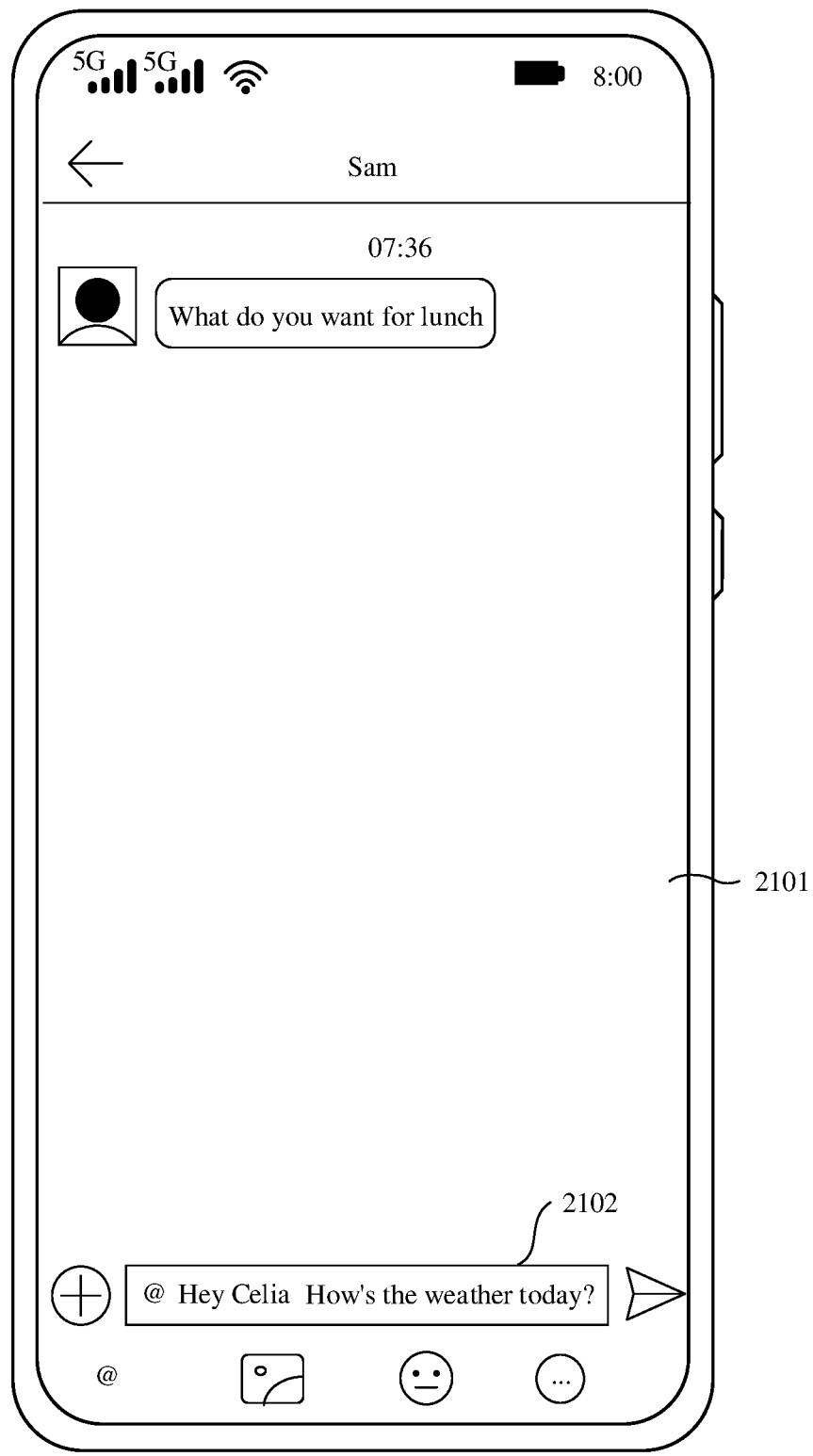
FIG. 25A and FIG. 25B are a schematic diagram 20 of an application scenario of a device recommendation method according to an embodiment of this application.

In some embodiments, if it is detected that the user selects the intelligent assistant "Hey Celia" 2105 on the reminder interface 2104, as shown in FIG. 25A, the chat app may automatically input information about "@Hey Celia" in the input box 2102 on the chat interface 2101. However, the last chat message 2201 that includes the text on the chat interface 2101 is not input in the input box 2102. Correspondingly, the user may continue to input, in the input box 2102, text information that needs to be exchanged with the intelligent assistant "Hey Celia", for example, "How is the weather today?". Further, if it is detected that the user taps a sending button of the chat message, similar to that in the foregoing embodiment, the chat app may invoke an application service of the intelligent assistant "Hey Celia", and input, in the application service of "Hey Celia", text content entered by the user in the input box 2102 to "Hey Celia", so that the intelligent assistant "Hey Celia" can query related service content based on the text content entered by the user in the input box 2102, and present the related service content to the user.

Figure 25B:
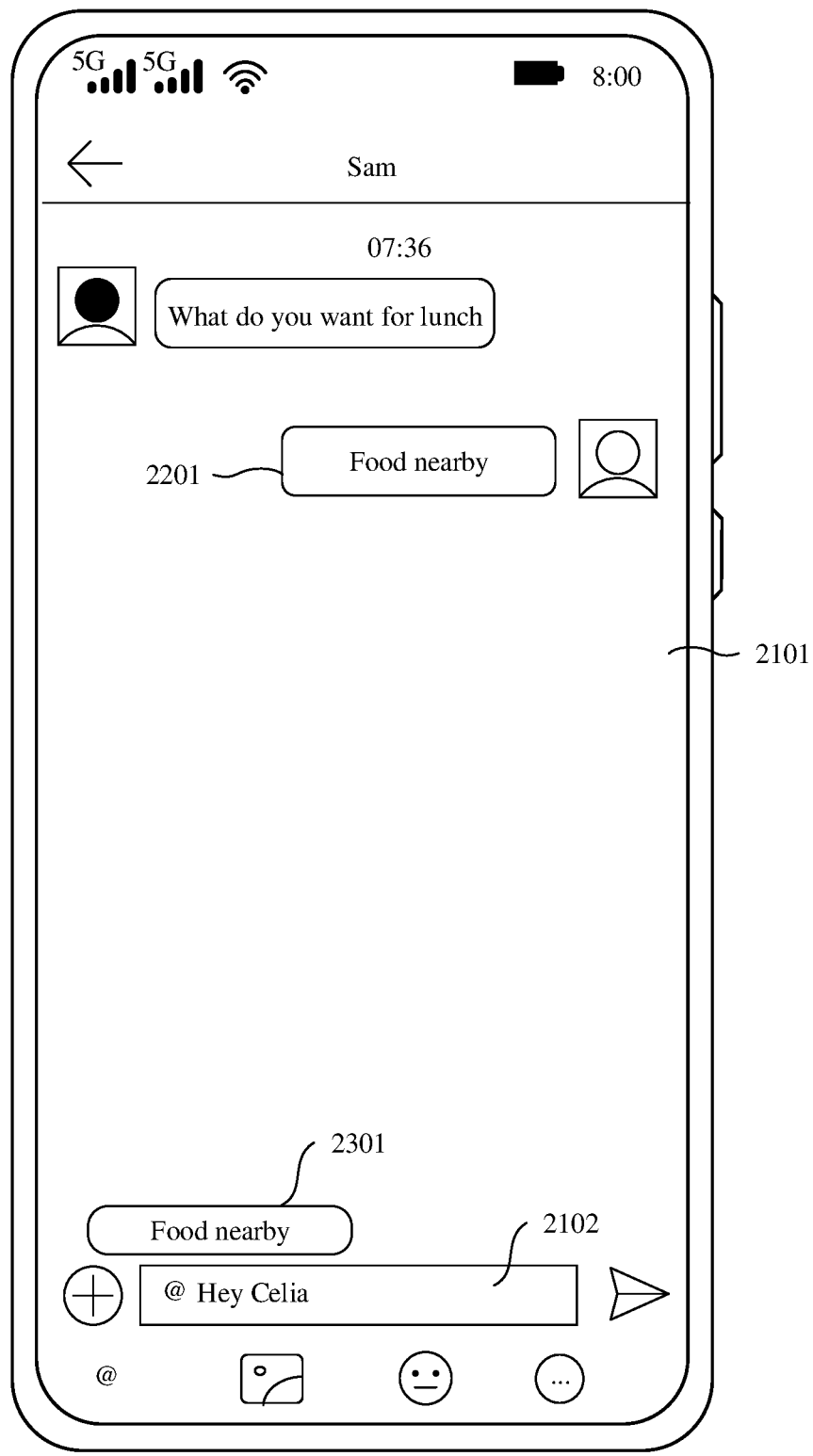

Alternatively, if it is detected that the user selects the intelligent assistant "Hey Celia" 2105 on the reminder interface 2104, as shown in FIG. 25B, the chat app may automatically input information about "@Hey Celia" in the input box 2102 on the chat interface 2101. In addition, the chat app may display, near the input box 2102, text information 2301 of the last chat message 2201 that includes a text and that is on the chat interface 2101. Subsequently, if it is detected that the user taps the text information 2301 near the input box 2102, it indicates that the user needs to interact with the intelligent assistant "Hey Celia" 2105. Similar to that in the foregoing embodiment, the chat app may invoke an application service of the intelligent assistant "Hey Celia", and input the text information 2301 in the application service of "Hey Celia", so that the intelligent assistant "Hey Celia" can query related service content based on the text information 2301, and present the related service content to the user.

Further, still as shown in FIG. 24C, after the chat app shares the first service content 2203 to the chat interface 2101 in a form of a chat message, both a sender (that is, the user) and a receiver (that is, the contact Sam) of the chat message can open the first service content 2203 by using the chat message as an entry. For example, if it is detected that the user taps the first service content 2203 in the chat message, the chat app may invoke a startActivity interface, and transfer a link of the first service content 2203 as an input parameter to the startActivity interface. Further, the startActivity interface may run a corresponding application based on the link, and open the corresponding first service content 2203 in the application. Similarly, after receiving the chat message including the first service content 2203, the contact Sam may also open the corresponding first service content 2203 according to the foregoing method. This is not limited in this embodiment of this application.

Figure 26:
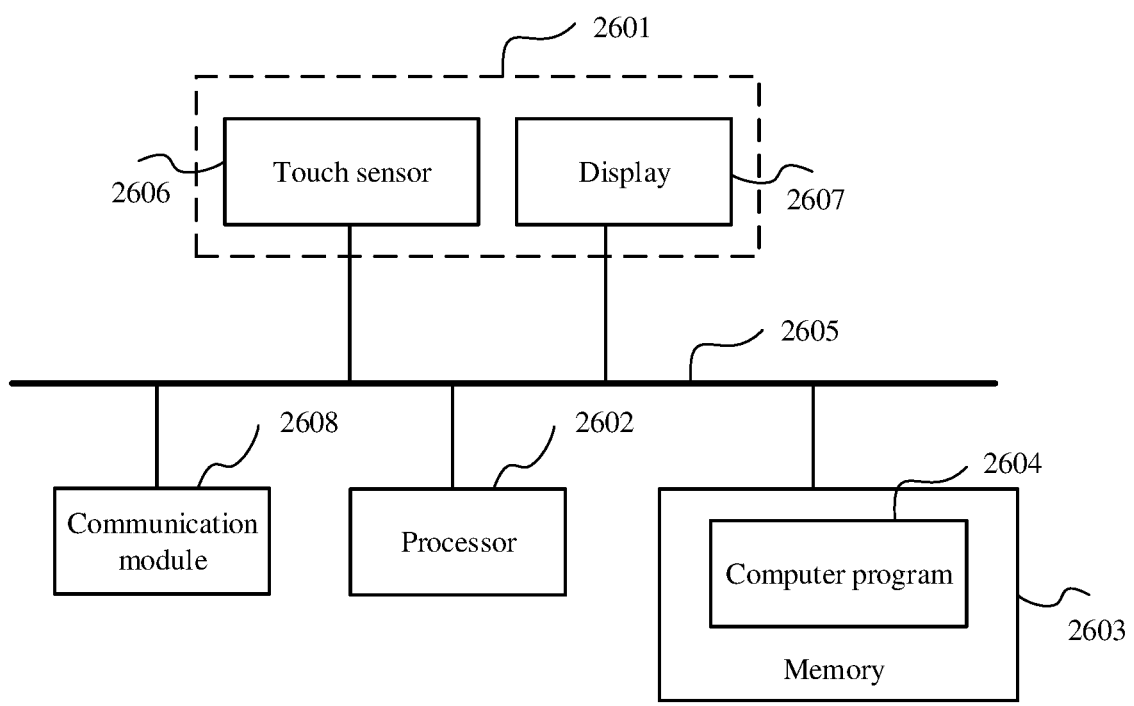
FIG. 26 is a schematic diagram 2 of a structure of an electronic device according to an embodiment of this application.

As shown in FIG. 26, an embodiment of this application discloses an electronic device, for example, the mobile phone in the foregoing embodiment. The electronic device may specifically include a display 2607, one or more processors 2602, a memory 2603, a communication module 2608, one or more applications (not shown), and one or more computer programs 2604. The foregoing components may be connected by using one or more communication buses 2605. The one or more computer programs 2604 are stored in the memory 2603 and are configured to be executed by the one or more processors 2602. The one or more computer programs 2604 include instructions, where the instructions may be used to perform related steps performed by the mobile phone in the foregoing embodiment. The electronic device may further include input devices such as a touch sensor 2606 (the touch sensor 2606 and the display 2607 may be integrated into a touchscreen 2601) and a mouse.

The descriptions in the foregoing implementations allow a person skilled in the art to clearly understand that, for the purpose of convenient and brief description, division of the foregoing functional modules is merely used as an example for illustration. In actual application, the foregoing functions can be allocated to different modules and implemented based on a requirement. In other words, an inner structure of an apparatus is divided into different functional modules to implement all or some of the functions described above. For a detailed working process of the foregoing system, apparatus, and unit, refer to a corresponding process in the foregoing method embodiment. Details are not described herein again.

Functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of embodiments of this application essentially, or a part that contributes to a current technology, or all or a part of the technical solutions may be embodied in a form of a software product. The computer software product is stored in a storage medium, and includes several instructions for instructing a computer device (which may be a personal computer, a server, or a network device) or a processor to perform all or some of the steps of the methods in embodiments of this application. The storage medium includes any medium that can store program code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
    displaying, by a first device, a chat interface during a chat with a first contact, wherein the chat interface comprises a first chat message;
    displaying, by the first device, first prompt information on the chat interface when the first chat message comprises first content, wherein the first prompt information recommends a second device to a user;
    displaying, by the first device, second prompt information on the chat interface in response to an operation of confirming the first prompt information by the user, wherein the second prompt information prompts the user to open the first content in the second device; and
    in response to an operation of confirming the second prompt information by the user, indicating, by the first device, the second device to open the first content.

2. The method according to claim 1, wherein the first chat message is a last chat message on the chat interface when the first prompt information is displayed.

3. The method according to claim 1, wherein the first device stores correspondences between different types of content and different recommended devices; and
    wherein before displaying, by the first device, the second device recommended to the user on the chat interface, the method further comprises:
    obtaining, by the first device, one or more electronic devices associated with the first device; and
    determining, by the first device in the one or more electronic devices based on the correspondences, the second device corresponding to the first content in the first chat message.

4. The method according to claim 1, wherein the first content comprises a video, audio, a picture, a document, or a card of a preset type.

5. The method according to claim 1, wherein the chat interface further comprises an input box of a chat message, and displaying, by the first device, the first prompt information on the chat interface comprises:
    displaying, by the first device, the first prompt information in the input box, wherein the first prompt information comprises a preset symbol and an identifier of the second device.

6. The method according to claim 5, wherein before displaying, by the first device, the first prompt information in the input box, the method further comprises:
    when it is detected, within a first preset time period, that the input box obtains an input focus, determining, by the first device, that the user confirms the first prompt information.

7. The method according to claim 5, wherein before displaying, by the first device, the first prompt information in the input box, the method further comprises:
    when it is not detected, within a first preset time period, that the input box obtains an input focus, hiding, by the first device, the first prompt information in the input box.

8. The method according to claim 1, wherein after displaying, by the first device, the second prompt information on the chat interface, the method further comprises:
    when it is detected, within a second preset time period, that the user taps the second prompt information or a confirmation button in the second prompt information, determining, by the first device, that the user confirms the second prompt information.

9. The method according to claim 1, wherein after displaying, by the first device, the second prompt information on the chat interface, the method further comprises:
    when it is not detected, within a second preset time period, that the user taps the second prompt information or a confirmation button in the second prompt information, hiding, by the first device, the second prompt information on the chat interface.

10. The method according to claim 1, wherein before indicating, by the first device, the second device to open the first content, the method further comprises:
    searching for, by the first device, the second device by using a near field communication function.

11. The method according to claim 10, further comprising:
    when the first device does not find the second device by using the near field communication function, indicating, by the first device, to the second device to display third prompt information, wherein the third prompt information prompts the user to determine to open the first content in the second device.

12. A method, comprising:
    displaying, by a first device, a chat interface during a chat with a first contact;
    displaying, by the first device, a device recommendation list in response to a preset operation entered by a user on the chat interface, wherein the device recommendation list comprises one or more electronic devices associated with the first device;
    displaying, by the first device, first prompt information in response to an operation of selecting a second device from the device recommendation list by the user, wherein the first prompt information prompts the user to use the second device to open one or more pieces of content in a chat message; and
    indicating, by the first device in response to an operation of confirming the first prompt information by the user, the second device to open the one or more pieces of content.

13. The method according to claim 12, wherein the chat interface further comprises an input box of the chat message, and the preset operation is an operation of entering a preset symbol in the input box by the user; and
    wherein displaying, by the first device, the device recommendation list comprises:

switching, by the first device, from the chat interface to a recommendation interface, and displaying the device recommendation list on the recommendation interface.

14. The method according to claim 13, wherein displaying, by the first device, the first prompt information comprises:
    displaying, by the first device, the first prompt information in the input box, wherein the first prompt information comprises the preset symbol and an identifier of the second device.

15. The method according to claim 13, wherein the chat interface comprises a first chat message and a second chat message, the first chat message comprises first content, and the second chat message comprises second content; and
    wherein before displaying, by the first device, the device recommendation list, the method further comprises:
        determining, by the first device, a first recommended device corresponding to the first content in the one or more electronic devices associated with the first device; and
        determining, by the first device, a second recommended device corresponding to the second content in the one or more electronic devices associated with the first device, wherein the device recommendation list comprises the first recommended device and the second recommended device.

16. The method according to claim 15, wherein the first chat message and the second chat message are chat messages sent within a latest preset time period when the device recommendation list is displayed.

17. The method according to claim 12, wherein the chat interface comprises a third chat message, the third chat message comprises third content, and the preset operation is a touch-and-hold operation performed by the user on the third chat message; and
    wherein displaying, by the first device, the device recommendation list comprises:
        displaying, by the first device, a touch-and-hold menu on the chat interface, wherein the touch-and-hold menu comprises the device recommendation list.

18. The method according to claim 17, wherein before the displaying, by the first device, the touch-and-hold menu on the chat interface, the method further comprises:
    determining, by the first device, a third recommended device corresponding to the third content in the one or more electronic devices associated with the first device, wherein the device recommendation list comprises the third recommended device.

19. The method according to claim 12, wherein after the operation of selecting the second device from the device recommendation list by the user is detected, and before the displaying, by the first device, first prompt information, the method further comprises:
    displaying, by the first device, a selection interface, wherein a candidate item on the selection interface is content comprised in one or more chat messages on the chat interface; and
    determining, by the first device in response to the candidate item selected by the user on the selection interface, one or more pieces of content played on the second device.

20. An electronic device, comprising:
    a display;
    one or more processors;
    a memory; and
    a communication interface;
    wherein the memory stores one or more computer programs, the one or more computer programs comprise instructions, and when the instructions are executed by the electronic device, the electronic device is enabled to perform:
    displaying a chat interface during a chat with a first contact, wherein the chat interface comprises a first chat message;
    displaying first prompt information on the chat interface when the first chat message comprises first content, wherein the first prompt information recommends a second device to a user;
    displaying second prompt information on the chat interface in response to an operation of confirming the first prompt information by the user, wherein the second prompt information prompts the user to open the first content in the second device; and
    in response to an operation of confirming the second prompt information by the user, indicating to the second device to open the first content.

* * * * *